(12) United States Patent
Hughes et al.

(10) Patent No.: US 7,633,741 B2
(45) Date of Patent: Dec. 15, 2009

(54) SWITCHGEAR BUS SUPPORT SYSTEM AND METHOD

(75) Inventors: David Charles Hughes, Rubicon, WI (US); Brian Todd Steinbrecher, Brookfield, WI (US); Dan Wycklendt, Shorewood, WI (US); Timothy A. Myers, Mukwonago, WI (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 11/738,941

(22) Filed: Apr. 23, 2007

(65) Prior Publication Data

US 2008/0259532 A1    Oct. 23, 2008

(51) Int. Cl.
*H02B 1/04* (2006.01)
(52) U.S. Cl. .................. 361/611; 361/605; 361/637; 361/641; 361/648; 174/70 B; 174/73.1
(58) Field of Classification Search .................. None
See application file for complete search history.

(56) References Cited

U.S. PATENT DOCUMENTS

| | | |
|---|---|---|
| 1,903,956 A | 4/1933 | Christie et al. |
| 2,953,724 A | 9/1960 | Hilfiker et al. |
| 3,115,329 A | 12/1963 | Wing et al. |
| 3,315,132 A * | 4/1967 | Lucas .................. 361/829 |
| 3,392,363 A | 7/1968 | Geis, Jr. et al. |
| 3,471,669 A | 10/1969 | Curtis |
| 3,474,386 A | 10/1969 | Link |
| 3,509,516 A | 4/1970 | Phillips |
| 3,509,518 A | 4/1970 | Phillips |
| 3,513,425 A | 5/1970 | Arndt |
| 3,539,972 A | 11/1970 | Silva et al. |
| 3,542,986 A | 11/1970 | Kotski |
| 3,546,535 A | 12/1970 | Van Riemsdijk |
| 3,576,493 A | 4/1971 | Tachick et al. |
| 3,594,685 A | 7/1971 | Cunningham |
| 3,652,975 A | 3/1972 | Keto |
| 3,654,590 A | 4/1972 | Brown |
| 3,663,928 A | 5/1972 | Keto |
| 3,670,287 A | 6/1972 | Keto |
| 3,678,432 A | 7/1972 | Boliver |
| 3,720,904 A | 3/1973 | De Sio |
| 3,725,846 A | 4/1973 | Strain |
| 3,740,503 A | 6/1973 | Tomohiro et al. |
| 3,740,511 A | 6/1973 | Westmoreland |

(Continued)

FOREIGN PATENT DOCUMENTS

DE    3110609    10/1982

(Continued)

OTHER PUBLICATIONS

Loadbreak Apparatus Connectors Service Information 500-26, Cooper Power Systems, May 2003, Waukesha, WI.

(Continued)

*Primary Examiner*—Boris L Chervinsky
(74) *Attorney, Agent, or Firm*—King & Spalding LLP

(57) ABSTRACT

Apparatus, method, and system for rigidly supporting a switchgear bus assembly through the use of one or more support plates, thereby providing the primary support for the other active modules and bushings.

30 Claims, 13 Drawing Sheets

U.S. PATENT DOCUMENTS

| | | | |
|---|---|---|---|
| 3,798,586 A | 3/1974 | Huska | |
| 3,826,860 A | 7/1974 | De Sio et al. | |
| 3,845,233 A | 10/1974 | Burton | |
| 3,860,322 A | 1/1975 | Sankey et al. | |
| 3,915,534 A | 10/1975 | Yonkers | |
| 3,924,914 A | 12/1975 | Banner | |
| 3,945,699 A | 3/1976 | Westrom | |
| 3,949,343 A | 4/1976 | Yonkers | |
| 3,953,099 A | 4/1976 | Wilson | |
| 3,955,874 A | 5/1976 | Boliver | |
| 3,957,332 A | 5/1976 | Lambert, III | |
| 3,960,433 A | 6/1976 | Boliver | |
| 4,029,380 A | 6/1977 | Yonkers | |
| 4,040,696 A | 8/1977 | Wada et al. | |
| 4,067,636 A | 1/1978 | Boliver et al. | |
| 4,088,383 A | 5/1978 | Fischer et al. | |
| 4,102,608 A | 7/1978 | Balkau et al. | |
| 4,103,123 A | 7/1978 | Marquardt | |
| 4,107,486 A | 8/1978 | Evnas | |
| 4,113,339 A | 9/1978 | Eley | |
| 4,123,131 A | 10/1978 | Pearce, Jr. et al. | |
| 4,152,643 A | 5/1979 | Schweitzer | |
| 4,154,993 A | 5/1979 | Kumbera et al. | |
| 4,161,012 A | 7/1979 | Cunningham | |
| 4,163,118 A | 7/1979 | Marien et al. | |
| 4,186,985 A | 2/1980 | Stepniak et al. | |
| 4,203,017 A | 5/1980 | Lee | |
| 4,210,381 A | 7/1980 | Borgstrom | |
| 4,223,179 A | 9/1980 | Lusk et al. | |
| 4,260,214 A | 4/1981 | Dorn | |
| 4,343,356 A | 8/1982 | Riggs et al. | |
| 4,353,611 A | 10/1982 | Siebens et al. | |
| 4,354,721 A | 10/1982 | Luzzi | |
| 4,360,967 A | 11/1982 | Luzzi et al. | |
| 4,443,054 A | 4/1984 | Ezawa et al. | |
| 4,463,227 A | 7/1984 | Dizon et al. | |
| 4,484,169 A | 11/1984 | Nishikawa | |
| 4,500,935 A | 2/1985 | Tsuruta et al. | |
| 4,508,413 A | 4/1985 | Bailey | |
| 4,568,804 A | 2/1986 | Leuhring | |
| 4,600,260 A | 7/1986 | Stepniak et al. | |
| 4,626,755 A | 12/1986 | Butcher et al. | |
| 4,638,403 A | 1/1987 | Amano et al. | |
| 4,678,253 A * | 7/1987 | Hicks et al. | 439/210 |
| 4,688,013 A | 8/1987 | Nishikawa et al. | |
| 4,700,258 A | 10/1987 | Farmer | |
| 4,715,104 A | 12/1987 | Schoenwetter et al. | |
| 4,722,694 A | 2/1988 | Makal et al. | |
| 4,767,894 A | 8/1988 | Schombourg | |
| 4,767,941 A | 8/1988 | Brand et al. | |
| 4,779,341 A | 10/1988 | Roscizewski | |
| 4,793,637 A | 12/1988 | Laipply et al. | |
| 4,799,895 A | 1/1989 | Borgstrom | |
| 4,820,183 A | 4/1989 | Knapp et al. | |
| 4,822,291 A | 4/1989 | Cunningham | |
| 4,822,951 A * | 4/1989 | Wilson et al. | 174/68.2 |
| 4,834,677 A | 5/1989 | Archang | |
| 4,857,021 A | 8/1989 | Boliver et al. | |
| 4,863,392 A | 9/1989 | Borgstrom et al. | |
| 4,867,687 A | 9/1989 | Williams et al. | |
| 4,871,888 A | 10/1989 | Bestel | |
| 4,891,016 A | 1/1990 | Luzzi et al. | |
| 4,911,655 A | 3/1990 | Pinyan et al. | |
| 4,946,393 A | 8/1990 | Borgstrom | |
| 4,955,823 A | 9/1990 | Luzzi | |
| 4,972,049 A | 11/1990 | Muench | |
| 4,982,059 A | 1/1991 | Bestel | |
| 5,025,121 A | 6/1991 | Allen et al. | |
| 5,045,656 A | 9/1991 | Kojima | |
| 5,045,968 A | 9/1991 | Suzuyama et al. | |
| 5,053,584 A * | 10/1991 | Chojnowski | 174/99 B |
| 5,101,080 A * | 3/1992 | Ferenc | 174/68.2 |
| 5,114,357 A | 5/1992 | Luzzi | |
| 5,128,824 A | 7/1992 | Yaworski et al. | |
| 5,130,495 A | 7/1992 | Thompson | |
| 5,166,861 A * | 11/1992 | Krom | 361/678 |
| 5,175,403 A | 12/1992 | Hamm et al. | |
| 5,213,517 A | 5/1993 | Kerek et al. | |
| 5,221,220 A | 6/1993 | Roscizewski | |
| 5,230,142 A | 7/1993 | Roscizewski | |
| 5,230,640 A | 7/1993 | Tardif | |
| 5,248,263 A | 9/1993 | Sakurai et al. | |
| 5,266,041 A | 11/1993 | De Luca | |
| 5,277,605 A | 1/1994 | Roscizewski et al. | |
| 5,356,304 A | 10/1994 | Colleran | |
| 5,358,420 A | 10/1994 | Cairns et al. | |
| 5,359,163 A | 10/1994 | Woodard | |
| 5,393,240 A | 2/1995 | Makal et al. | |
| 5,422,440 A * | 6/1995 | Palma | 174/133 B |
| 5,427,538 A * | 6/1995 | Knapp et al. | 439/157 |
| 5,429,519 A | 7/1995 | Murakami et al. | |
| 5,433,622 A | 7/1995 | Galambos | |
| 5,435,747 A | 7/1995 | Franckx et al. | |
| 5,445,533 A | 8/1995 | Roscizewski et al. | |
| 5,468,164 A | 11/1995 | Demissy | |
| 5,492,487 A | 2/1996 | Cairns et al. | |
| 5,525,069 A | 6/1996 | Roscizewski et al. | |
| 5,589,671 A | 12/1996 | Hackbarth et al. | |
| 5,619,021 A | 4/1997 | Yamamoto et al. | |
| 5,641,310 A | 6/1997 | Tiberio, Jr. | |
| 5,655,921 A | 8/1997 | Makal | |
| 5,661,280 A | 8/1997 | Kuss et al. | |
| 5,667,060 A | 9/1997 | Luzzi | |
| 5,717,185 A | 2/1998 | Smith | |
| 5,736,705 A | 4/1998 | Bestel et al. | |
| 5,737,874 A | 4/1998 | Sipos et al. | |
| 5,747,765 A | 5/1998 | Bestel et al. | |
| 5,747,766 A | 5/1998 | Waino et al. | |
| 5,757,260 A | 5/1998 | Smith et al. | |
| 5,766,030 A | 6/1998 | Suzuki | |
| 5,766,517 A | 6/1998 | Goedde et al. | |
| 5,795,180 A | 8/1998 | Siebens | |
| 5,808,258 A | 9/1998 | Luzzi | |
| 5,816,835 A | 10/1998 | Meszaros | |
| 5,846,093 A | 12/1998 | Muench et al. | |
| 5,857,862 A | 1/1999 | Muench et al. | |
| 5,864,942 A | 2/1999 | Luzzi | |
| 5,912,604 A | 6/1999 | Harvey et al. | |
| 5,917,167 A | 6/1999 | Bestel | |
| 5,936,825 A | 8/1999 | DuPont | |
| 5,949,641 A * | 9/1999 | Walker et al. | 361/600 |
| 5,953,193 A * | 9/1999 | Ryan | 361/118 |
| 5,957,712 A | 9/1999 | Stepniak | |
| 6,022,247 A | 2/2000 | Akiyama et al. | |
| 6,040,538 A | 3/2000 | French et al. | |
| 6,042,407 A | 3/2000 | Scull et al. | |
| 6,069,321 A * | 5/2000 | Wagener et al. | 174/99 B |
| 6,130,394 A | 10/2000 | Hogl | |
| 6,168,447 B1 | 1/2001 | Stepniak et al. | |
| 6,205,029 B1 * | 3/2001 | Byrne et al. | 361/724 |
| 6,213,799 B1 | 4/2001 | Jazowski et al. | |
| 6,220,888 B1 | 4/2001 | Correa | |
| 6,227,908 B1 | 5/2001 | Aumeier | |
| 6,250,950 B1 | 6/2001 | Pallai | |
| 6,280,659 B1 | 8/2001 | Sundin | |
| 6,332,785 B1 | 12/2001 | Muench, Jr. et al. | |
| 6,338,637 B1 | 1/2002 | Muench, Jr. et al. | |
| 6,362,445 B1 | 3/2002 | Mearchand et al. | |
| 6,364,216 B1 | 4/2002 | Martin | |
| 6,416,338 B1 | 7/2002 | Berlovan | |
| 6,453,776 B1 | 9/2002 | Beattie et al. | |
| 6,504,103 B1 | 1/2003 | Meyer et al. | |
| 6,517,366 B2 | 2/2003 | Bertini et al. | |
| 6,520,795 B1 | 2/2003 | Jazowski | |

| | | |
|---|---|---|
| 6,538,312 B1 | 3/2003 | Peterson et al. |
| 6,542,056 B2 | 4/2003 | Nerstron et al. |
| 6,566,996 B1 | 5/2003 | Douglass et al. |
| 6,585,531 B1 | 7/2003 | Stepniak et al. |
| 6,664,478 B2 * | 12/2003 | Mohan et al. ............ 174/149 B |
| 6,674,159 B1 | 1/2004 | Peterson et al. |
| 6,689,947 B2 | 2/2004 | Ludwig |
| 6,705,898 B2 | 3/2004 | Pechstein et al. |
| 6,709,294 B1 | 3/2004 | Cohen et al. |
| 6,733,322 B2 | 5/2004 | Boemmel et al. |
| 6,744,255 B1 | 6/2004 | Steinbrecher et al. |
| 6,790,063 B2 | 9/2004 | Jazowski et al. |
| 6,796,820 B2 | 9/2004 | Jazowski et al. |
| 6,809,413 B1 | 10/2004 | Peterson et al. |
| 6,811,418 B2 | 11/2004 | Jazowski et al. |
| 6,830,475 B2 | 12/2004 | Jazowski et al. |
| 6,843,685 B1 | 1/2005 | Borgstrom et al. |
| 6,888,086 B2 | 5/2005 | Daharsh et al. |
| 6,905,356 B2 | 6/2005 | Jazowski et al. |
| 6,936,947 B1 | 8/2005 | Leijon et al. |
| 6,939,151 B2 | 9/2005 | Borgstrom et al. |
| 6,972,378 B2 | 12/2005 | Schomer et al. |
| 6,984,791 B1 | 1/2006 | Meyer et al. |
| 7,018,236 B2 | 3/2006 | Nishio et al. |
| 7,019,606 B2 | 3/2006 | Williams et al. |
| 7,044,760 B2 | 5/2006 | Borgstrom et al. |
| 7,044,769 B2 | 5/2006 | Zhao et al. |
| 7,050,278 B2 | 5/2006 | Poulsen |
| 7,059,879 B2 | 6/2006 | Krause et al. |
| 7,077,672 B2 | 7/2006 | Krause et al. |
| 7,079,367 B1 | 7/2006 | Liljestrand |
| 7,083,450 B1 | 8/2006 | Hughes |
| 7,104,822 B2 | 9/2006 | Jazowski et al. |
| 7,104,823 B2 | 9/2006 | Jazowski et al. |
| 7,108,568 B2 | 9/2006 | Jazowski et al. |
| 7,134,889 B2 | 11/2006 | Hughes et al. |
| 7,150,098 B2 | 12/2006 | Borgstrom et al. |
| 7,168,983 B2 | 1/2007 | Graf et al. |
| 7,170,004 B2 | 1/2007 | Gramespacher et al. |
| 7,182,647 B2 | 2/2007 | Muench et al. |
| 7,212,389 B2 | 5/2007 | Hughes |
| 7,216,426 B2 | 5/2007 | Borgstrom et al. |
| 7,234,980 B2 | 6/2007 | Jazowski et al. |
| 7,247,061 B2 | 7/2007 | Hoxha et al. |
| 7,247,266 B2 | 7/2007 | Bolcar |
| 7,258,585 B2 | 8/2007 | Hughes et al. |
| 7,278,889 B2 | 10/2007 | Muench et al. |
| 7,341,468 B2 | 3/2008 | Hughes et al. |
| 2001/0008810 A1 | 7/2001 | George et al. |
| 2002/0055290 A1 | 5/2002 | Jazowski et al. |
| 2003/0228779 A1 | 12/2003 | Jazowski et al. |
| 2004/0121657 A1 | 6/2004 | Muench et al. |
| 2005/0208808 A1 | 9/2005 | Jazowski et al. |
| 2005/0212629 A1 | 9/2005 | William et al. |
| 2005/0260876 A1 | 11/2005 | Krause et al. |
| 2006/0110983 A1 | 5/2006 | Muench et al. |
| 2006/0160388 A1 | 7/2006 | Hughes et al. |
| 2006/0216992 A1 | 9/2006 | Hughes et al. |
| 2007/0026713 A1 | 2/2007 | Hughes et al. |
| 2007/0026714 A1 | 2/2007 | Hughes et al. |
| 2007/0032110 A1 | 2/2007 | Hughes et al. |
| 2007/0097601 A1 | 5/2007 | Hughes et al. |
| 2007/0108164 A1 | 5/2007 | Muench et al. |

FOREIGN PATENT DOCUMENTS

| | | |
|---|---|---|
| DE | 3521365 | 2/1987 |
| DE | 19906972 A1 | 2/1999 |
| EP | 0624940 | 11/1994 |
| EP | 0782162 A2 | 7/1997 |
| EP | 0957496 | 11/1999 |
| FR | 2508729 | 12/1982 |
| GB | 105227 | 2/1918 |
| GB | 2254493 | 10/1992 |
| JP | S62-198677 | 12/1987 |
| JP | S63-93081 | 6/1988 |
| JP | H1-175181 | 7/1989 |
| JP | H3-88279 | 9/1991 |
| JP | H4-54164 | 5/1992 |
| WO | WO 00/41199 | 7/2000 |

OTHER PUBLICATIONS

Deadbreak Appatus Connectors Electrical Apparatus, Cooper Power Systems, Jul. 1999, Marketing Material.

Installation Instructions, 650LK-B Link Operable Connector System (Bolted) May 1, 1989.

G&W Electric Co.; "Breakthrough in Switching Technology; Solid Dielectric Switchgear"; Oct. 2001; Blue Island, IL. cited by other.

Cooper Power Systems; "Padmounted Switchgear; Type RVAC, Vacuum-Break Switch, Oil-Insulated or SF.sub.6-Insulated; Electrical Apparatus 285-50"; Jul. 1998. cited by other.

Cooper Power Systems; "Padmounted Switchgear; Type MOST Oil Switch; Electrical Apparatus 285-20"; Jul. 1998. cited by other.

Cooper Power Systems; "Molded Rubber Products; 600 A 35 kV Class Bol-T.TM. Deadbreak Connector; Electrical Apparatus 600-50"; Jan. 1990. cited by other.

Cooper Power Systems; "Padmounted Switchgear; Kyle.RTM. Type VFI Vacuum Fault Interrupter; Electrical Apparatus 285-10", Jan. 1998. cited by other.

"Loadbreak Appatus Connectors, 200 A 25kV Class—Expanded Range Loadbreak Elbow Connector, Electrical Apparatus 500-28"; Cooper Power Systems; pp. 1-4; (Jan. 2004). cited by other.

Kevin Fox, "The Cooper Posi-Break.TM. Solution to Separable Connector Switching Problems at Wisconsin Electric Power Company," Component Products, Bulletin No. 98065, copyright 1998 Cooper Power Systems, MI 10/98 5M, 2 total pages. cited by other.

"The Cooper Posi-Break.TM., Elbow and Cap, Engineered Solution Increases Strike Distance and Improves Reliability," copyright 1998 Cooper Power Systems, Inc., Bulletin 98014, MI 398/15M, 6 total pages. cited by other.

Loadbreak Apparatus Connectors, "200 A 25 kV Class Loadbreak Bushing Insert," Service Information 500-26, Cooper Power Systems, May 2003, pp. 1-2. cited by other.

Loadbreak Apparatus Connectors, "200 A kV Class Cooper Posi-Break.TM. Expanded Range Loadbreak Elbow Connector," Service Information 500-29, Cooper Power Systems, Jan. 2004, pp. 1-4. cited by other.

Product Brief, "Latched Elbow Indicator," Cooper Power Systems, Bulletin 94014, Apr. 1994, 1 total page. cited by other.

"Stick-OPerable 600-Amp Connector Systems," *Elastimold, Amerace Corporation*, Feb. 1984, 11 pages.

"Molded Rubber Products, 600 A 15 kV Class T-OP™ II Deadbreak Connector Electrical Apparatus 600-12," *Cooper Power Systems*, Jul. 2005, pp. 1-4.

"Molded Rubber Products, 600 A 15 and 25 kV Deadbreak Accessories, Tools, Replacement Parts Electrical Apparatus 600-46"; *Cooper Power Systems*, Jul. 1997, pp. 1-4.

"Molded Rubber Products, 600 A 25 kV Class BT-TAP™ Deadbreak Connector Electrical Apparatus, 600-35," *Cooper Power Systems*, Mar. 2003, pp. 1-5.

"Deadbreak Apparatus Connectors, 600 A 15/25 kV Class Bol-T™ Deadbreak Connector Electrical Apparatus 600-10," *Cooper Power Systems*, Aug. 2002, 6 pages.

"Deadbreak Apparatus Connector, 600 A 25 kV Class Bushing Adapter for T-OP™ II Connector Systems (including LRTP and Bushing Extender) Electrical Apparatus 600-38," *Cooper Power Systems*, Jun. 1997, pp. 1-4.

"Loadbreak Apparatus Connectors, 200 A 15 kV Class Loadbreak Bushing Insert 500-12," *Cooper Power Systems*, Nov. 1995, pp. 1-2.

"T-OP™ II: How Many Sticks Does It Take To Operate Your 600 Amp Terminator System?," *Cooper Power Systems*, Jul. 1994, 4 pages.

"Installation & Operation Instructions 168ALR, Access Port Loadbreak Elbow Connectors"; *Elastimold IS-168ALR (Rev C)*; pp. 1-5; (Feb. 1, 1994).

"Operating Instructions 200TC-2"; *Elastimold IS-200TC (Rev-A)*; pp. 1-2; (Feb. 26, 1995).

"Surge Arresters"; *Elastimold Catalog*; pp. 26-27; (2001).

"Surge Arresters, Metal Oxide Varistor elbow (M.O.V.E.™) Surge Arrester Electrical Apparatus 235-65"; *Cooper Power Systems*; pp. 1-4; Dec. 2003.

"Surge Arresters, Metal Oxide Elbow Surge Arrester Electrical Apparatus 235-65"; *Cooper Power Systems*; pp. 1-4; Jan. 1991.

"Surge Arresters, Metal Oxide Varistor (MOV) Parking Stand Surge Arrester Electrical Apparatus 235-68"; *Cooper Power Systems*; pp. 1-3; Apr. 2002.

"INJPLUG35, 35 kV Amp Loadbreak Injection Plug Operating and Installation Instructions"; *Cooper Power Systems*; p. 1; (Sep. 2002).

"Loadbreak Apparatus Connectors, 200 A 15 kV Class Loadbreak Elbow Connector, Electrical Apparatus 500-10"; *Cooper Power Systems*; pp. 1-4; (Feb. 2004).

"Loadbreak Apparatus Connectors, 200 A 15 kV and 25 kV Class Elbow Installation Instructions, Service Information S500-10-1"; *Cooper Power Systems*; pp. 1-4; (Feb. 2001).

"Loadbreak Apparatus Connectors, 200 A 15kV Class Loadbreak Bushing Insert 500-12"; *Cooper Power Systems*; pp. 1-2; (Nov. 1995).

"Loadbreak Apparatus Connectors, 200 A 15kV Class Loadbreak Rotatable Feedthru Insert; Electrical Apparatus 500-13"; *Cooper Power Systems*; pp. 1-2; (Apr. 2001).

"Loadbreak Apparatus Connectors, 200 A 25 kV Class—Expanded Range Loadbreak Elbow Connector, Electrical Apparatus 500-28"; *Cooper Power Systems*; pp. 1-4; (Jan. 2004).

"Loadbreak Apparatus Connectors, 200 A 25 kV Class Rotatable Feedthru Insert, Electrical Apparatus 500-30"; *Cooper Power Systems*; pp. 1-2; (Jun. 1999).

"Loadbreak Apparatus Connectors, 200 A 35 kV Class Three-Phase Loadbreak Injection Elbow Installation Instructions, Service Information S500-55-2"; *Cooper Power Systems*; pp. 1-6; (Apr. 1999).

Cooper Power Systems, *Deadbreak Apparatus Connectors*, "600 A 15/25 kV Clas Bol-T™ Deadbreak Connector", Electrical Apparatus 600-30, pp. 1-6, Feb. 2003.

Cooper Power Systems, *Deadbreak Apparatus Connectors*, "600 A 15/25 kV Class PUSH-OP® Deadbreak Connector", Electrical Apparatus 600-33, pp. 1-4, Nov. 2004.

Cooper Power systems, *Molded Rubber Products*, "600 A 15/25 kV Class T-OP™ II Deadbreak Connector", Electrical Apparatus 600-32, pp. 1-4, Jul. 2005.

Cooper Power Systems, *OEM Equipment*, "Four-Position Sectionalizing Loadbreak Switches", Electrical Apparatus 800-64, pp. 1-8, Dec. 2003.

\* cited by examiner

SWITCHGEAR BUS SUPPORT SYSTEM AND METHOD

BACKGROUND OF THE INVENTION

The invention relates generally to a switchgear for electric power systems, and more particularly to a apparatus, system, and method for rigidly supporting a switchgear bus assembly through the use of one or more support plates, thereby providing the primary support for the other active modules and bushings in the switchgear.

DETAILED DESCRIPTION OF THE EXEMPLARY EMBODIMENTS

Electrical power is typically transmitted from substations through cables which interconnect other cables and electrical apparatus in a power distribution network. The cables are typically terminated on bushings that may pass through walls of metal encased equipment such as capacitors, transformers or switchgear. Such cables and equipment transmit electrical power at medium and high voltages generally greater than 600V.

Conventional switchgears included a sealed enclosure, or tank, filled with oil or air with the switchgear components positioned inside of the enclosure. The switchgear components include, but are not limited to, the busbar system, the vacuum bottle, switches, modules and bushings. In conventional switchgears, the bus work to connect all of the modules to the bushings has typically been just bare copper or bare aluminum, insulated with oil or air depending on the tank makeup.

The use of rubber insulated bus work allows for a smaller overall switchgear. However, in rubber insulated switchgears as well as those insulated with oil or air, the front plate of the enclosure is used as the main support for the internal components of the enclosure. For example, typically, the bushings and the modules are attached to the front plate of the enclosure, while the bus work, rods, and cables that go between the modules and the vacuum bottles and other switchgear components are suspended by the active modules in air or in the oil in the enclosure as the case may be.

By modifying the switchgear so that the busbar system is held rigid and allow the remaining bushings, modules, rods and cables to hang off of and be supported by the bus the switchgear can be manufactured in a more safety conscious and efficient manner. Moreover, this "start-inside-and-work-out" configuration allows modular construction for ease of manufacture and field changing of active modules. This key innovation is completely opposite of all conventional power distribution switchgear where an external frame or tank rigidly supports bushings and/or active switching elements. In the conventional switchgear the bus components hang from, and are wholly supported by, the active switching elements and bushings. This "start-outside-and-work-in" construction makes manufacturing and field modifications very difficult.

Exemplary embodiments of the inventive switchgear bus support system are described herein below. In one exemplary embodiment, the inventive bus support systems are operable in switchgear and other electrical equipment. Because the exemplary switchgear system is insulated with rubber rather than oil, it allows for replacement of components while the equipment is energized and still in service.

In order to fully appreciate the exemplary switchgear bus support system, some appreciation of electrical equipment is necessary.

Figure 1:
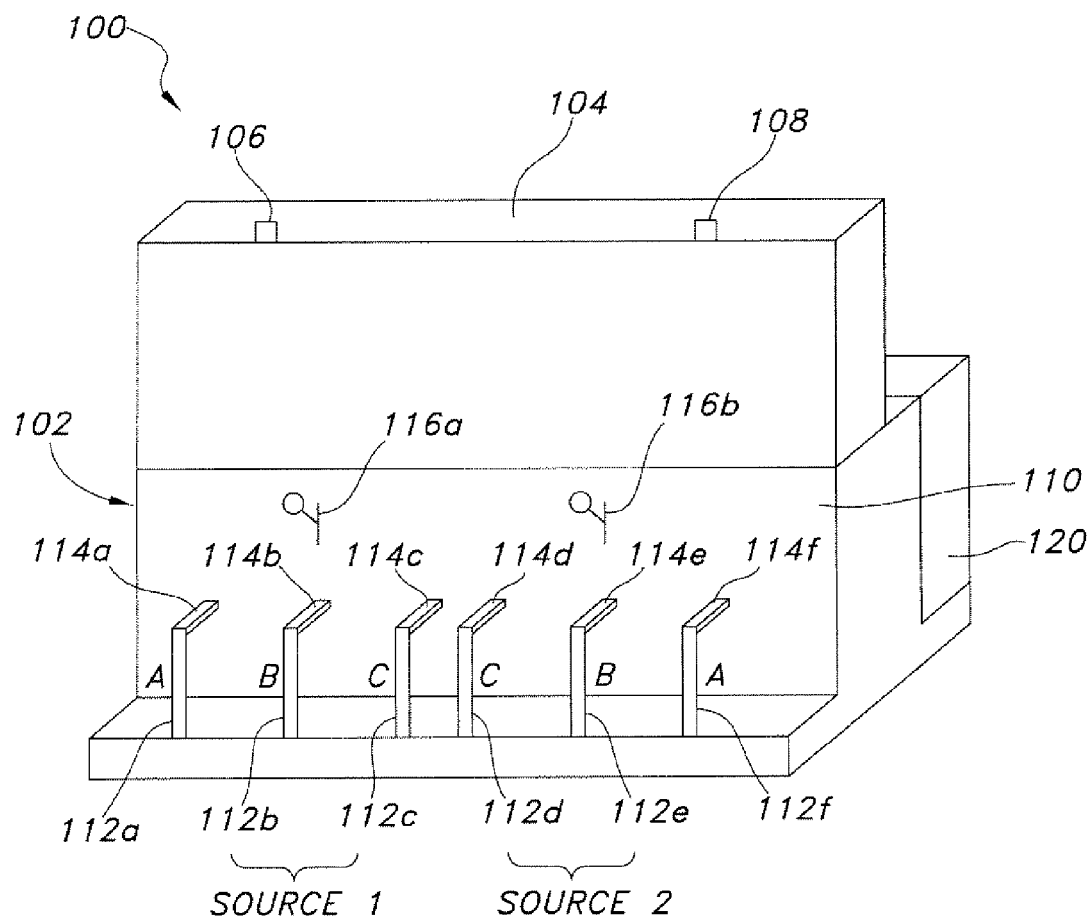
FIG. 1 is a perspective view of a known electrical switchgear viewed from a source side of the switchgear.

FIG. 1 illustrates an exemplary electrical equipment configuration 100 with which the exemplary switchgear bus support system, described below, may be used. While in an exemplary embodiment the electrical equipment 100 is a particular configuration of switchgear, it is understood that the benefits of the exemplary embodiment accrue generally to switchgear of many configurations. Accordingly, the switchgear 100 is illustrated and described herein for illustrative purposes only, and is not intended to be limited to any particular type of switchgear configuration, such as the switchgear 100.

Figure 2:
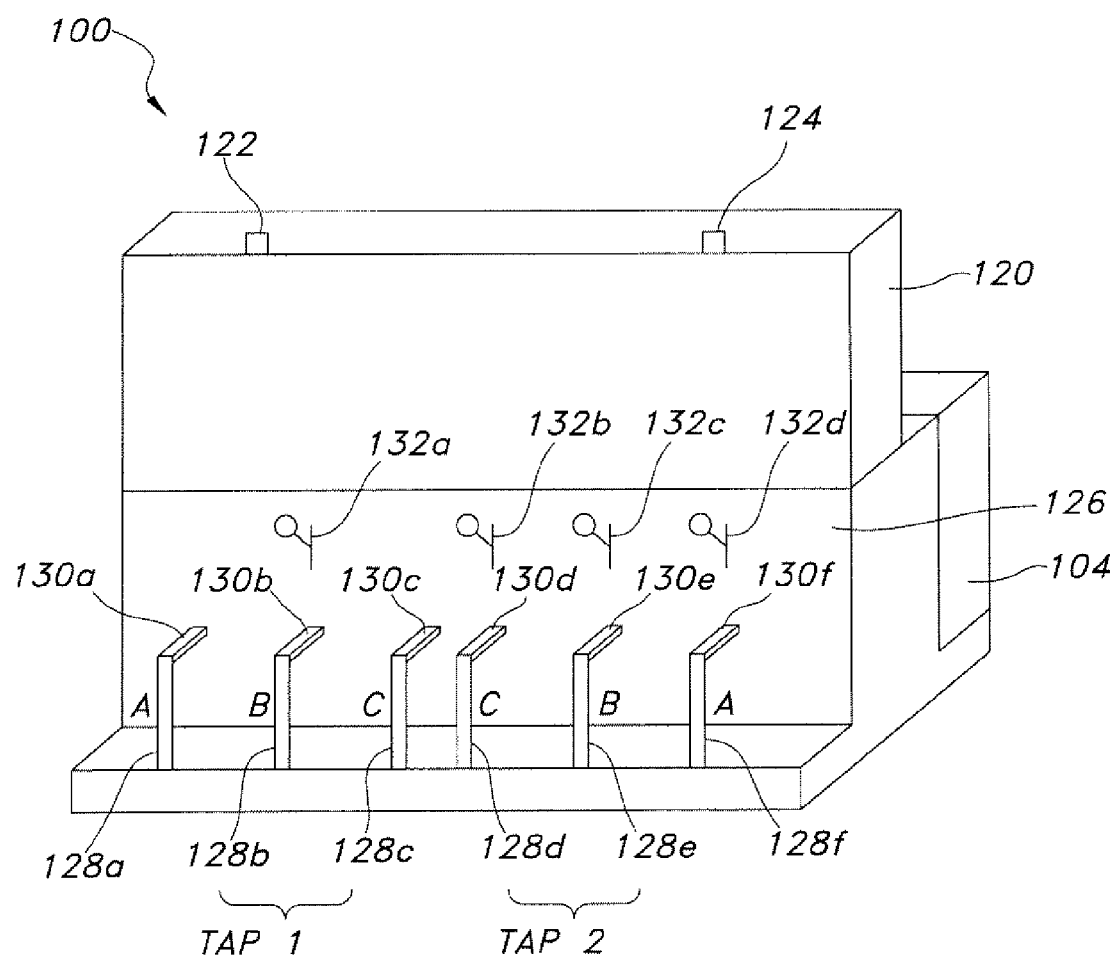
FIG. 2 is another perspective view of the switchgear shown in FIG. 1 viewed from a tap side of the switchgear.

As shown in FIG. 1, the switchgear 100 includes a protective enclosure 102 having, for example, a source side door 104 positionable between an open position (FIG. 1) and a closed position (FIG. 2). Latch elements 106 and/or 108 may be used to lock source side door 104 in a closed position. Inside the source side door 104 is a front plate 110 that forms a portion of the enclosure 102. Cables 112a-112f may be coupled to a lower end of the enclosure 102 and are connected to active switching elements (described below) in the enclosure 102, and each of the cables 112a-112f typically carry power in three phases from two different sources. For example, cables 112a-112c may carry, respectively, the A, B and C phases of power from source 1, and cables 112d-112f may carry, respectively, the C, B and A phases of power from source 2.

Cables 112a-112f may be coupled to the front-plate 110 and switchgear 100 through, for example, connector components 114a-114f that join the cables 112a-112f to respective switching elements (not shown in FIG. 1) in the enclosure 102. The switching elements may, in turn, be coupled to an internal busbar system (not shown in FIG. 1) in the enclosure 102.

Handles or levers 116a and 116b are coupled to the enclosure 102 and may operate active switchgear elements (described below) inside the switchgear 100 to open or interrupt the flow of current through the switchgear 100 via the cables 112a-112f and electrically isolate power sources 1 and 2 from load-side or power receiving devices. The cables 112a-112c may be disconnected from the internal busbar system by manipulating the handle 116a. Similarly, cables 112d-112f may be disconnected from the internal busbar system by manipulating the handle 116b. Handles 116a and 116b are mounted onto the front-plate 110 as shown in FIG. 1. In an exemplary embodiment, the active switch elements on the source side of the switchgear 100 are vacuum switch assemblies (described below), and the vacuum switch assemblies may be used in combination with other types of fault interrupters and fuses in various embodiments of the invention.

One exemplary use of switchgear is to segregate a network of power distribution cables into sections such as, for example, by opening or closing the switch elements. The switch elements may be opened or closed, either locally or remotely, and the power supplied from one source to the switchgear may be prevented from being conducted to the other side of the switchgear and/or to the bus. For example, by opening the switch levers 116a and 116b, power from each of the sources 1 and 2 on one side of the switchgear is prevented from being conducted to the other side of the switchgear and to the bus and the taps. In this manner, a utility company is able to segregate a portion of the network for maintenance, either by choice, through the opening of switchgear, or automatically for safety, through the use of a fuse or fault interrupter, depending on the type of active switching elements included in the switchgear.

Figure 13:
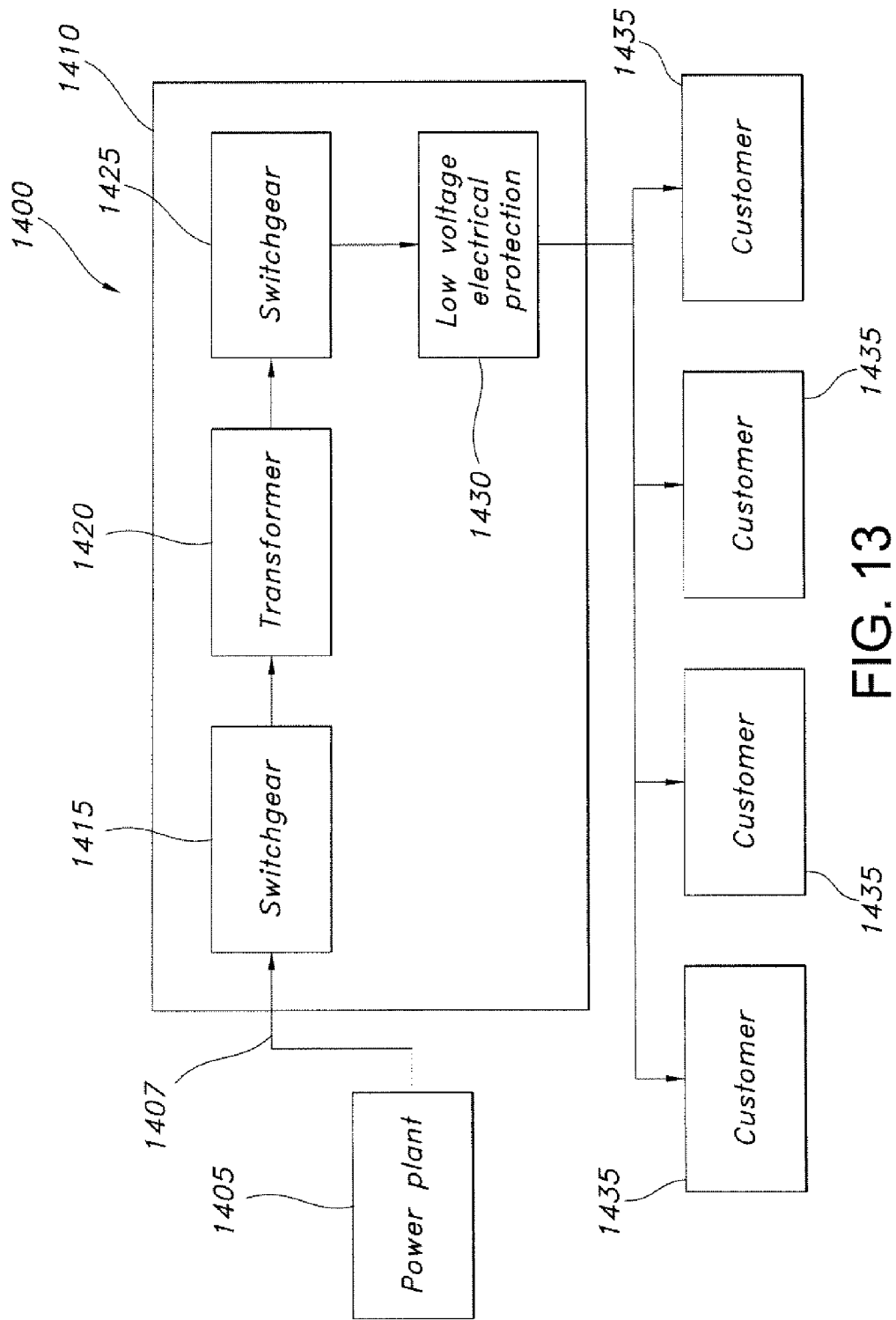
FIG. 13 illustrates an exemplary power system for use of the switchgear having the exemplary bus support system in accordance with one exemplary embodiment of the present invention.

FIG. 13 illustrates the use of the exemplary switchgear in an exemplary power distribution system 1400. A power plant 1405 or other power producing means knew known to those of skill in the art transmits power over high voltage cables 1407 to a substation 1410. While the current embodiment shows only one substation 1410, those of skill in the art will recognize that a number of substations may be employed between the power production facility 1405 and the customers receiving the power.

The contents of the substation have been simplified for means of explanation and can include a high voltage switchgear 1415 and a low voltage switchgear 1420 on each side of a transformer 1420. Power may then be transmitted through low voltage electrical protection 1430 before being transmitted to the customers. The low voltage electrical protection 1430 may include fuses and or circuit breakers, as well as means for connecting the cables from the second switchgear 1425 to the low voltage electrical protection 1430 and from the low voltage electrical protection 1430 to the customers 1435. The switchgears 1415 and 1425 are typically located on both the high voltage and low voltage side of the power transformer 1420 as shown in FIG. 13. The substation may also include fuses (not shown) to protect the transformer 1420.

The transformer 1420 transfers energy from one electrical circuit to another by magnetic coupling. The transformer 1420 typically includes two or more coupled windings and a magnetic core to concentrate magnetic flux. A voltage applied to one winding creates a time-varying magnetic flux in the core, which induces a voltage in the other windings. Varying the relative number of turns determines the voltage ratio between the windings, thus transforming the voltage from one circuit to another.

FIG. 2 illustrates another side of the switchgear 100 including a tap side door 120 that is positionable between open (shown in FIG. 2) and closed (FIG. 1) positions in an exemplary embodiment. Latch elements 122 and/or 124 may be used to lock the tap side door 120 in the closed position. Inside the tap door 120 is a front-plate 126 that defines a portion of the enclosure 102. Six cables 128a-128f may be connected to a lower side of the switchgear 100, and each of the respective cables 128a-128f typically carries, for example, one phase of power away from switchgear 100. For example, cable 128a may carry A phase power, cable 128b may carry B phase power and cable 128c may carry C phase power. Similarly, cable 128d may carry C phase power, cable 128e may carry B phase power and cable 128f may carry A phase power. Connectors 130a-130f connect cables 128a-128f to switchgear.

It should be noted that the exemplary switchgear 100 in FIGS. 1 and 2 shows only one exemplary type of phase configuration, namely an ABC CBA configuration from left to right in FIG. 2 so that the corresponding cables 128a-128c and 128d-128f carry the respective phases ABC and CBA in the respective tap 1 and tap 2. It is understood, however, that other phase configurations may be provided in other embodiments, including but not limited AA BB CC so that cables 128a and 128b each carry A phases of current, cables 128c and 128d each carry B phases of current, and so that cables 128e and 128f each carry C phases of current. Still other configurations of switchgear may have one or more sources and taps on the same front-plate 110 (FIG. 1) or 126 (FIG. 2), or on the sides of the switchgear on one or more additional front plates. It is also contemplated that each phase may be designated by a number, such as 1, 2 and 3, and that the switchgear may accommodate more or less than three phases of power. Thus, a switchgear may have, for example only, a configuration of 123456 654321 on the tap side of the switchgear 100.

A frame may be positioned internal to the switchgear and provide support for the busbar system, which in turn provides support for the active switching elements, described below. In other words, the frame holds the busbar system and the busbar system supports the active switching elements. The frame is oriented to allow portions of the active switching elements, typically bushings, to protrude as a bushing plane so that connections to the various cables can be made.

In an exemplary embodiment, a lever or handle 132a operates active switchgear elements, as described below, inside the switchgear 100 to disconnect cables 128a, 128b, 128c from the internal busbar system. Similarly, handles 132b-132d cause one of individual cables 128d, 128e, 128f to disconnect and connect, respectively, from the internal busbar system. In an exemplary embodiment, the active switchgear elements on the tap side of the switchgear 100 include vacuum interrupter assemblies (described below), and the vacuum interrupter assemblies may be used in combination with fuses and various types of fault interrupters in further and/or alternative embodiments.

Figure 3:
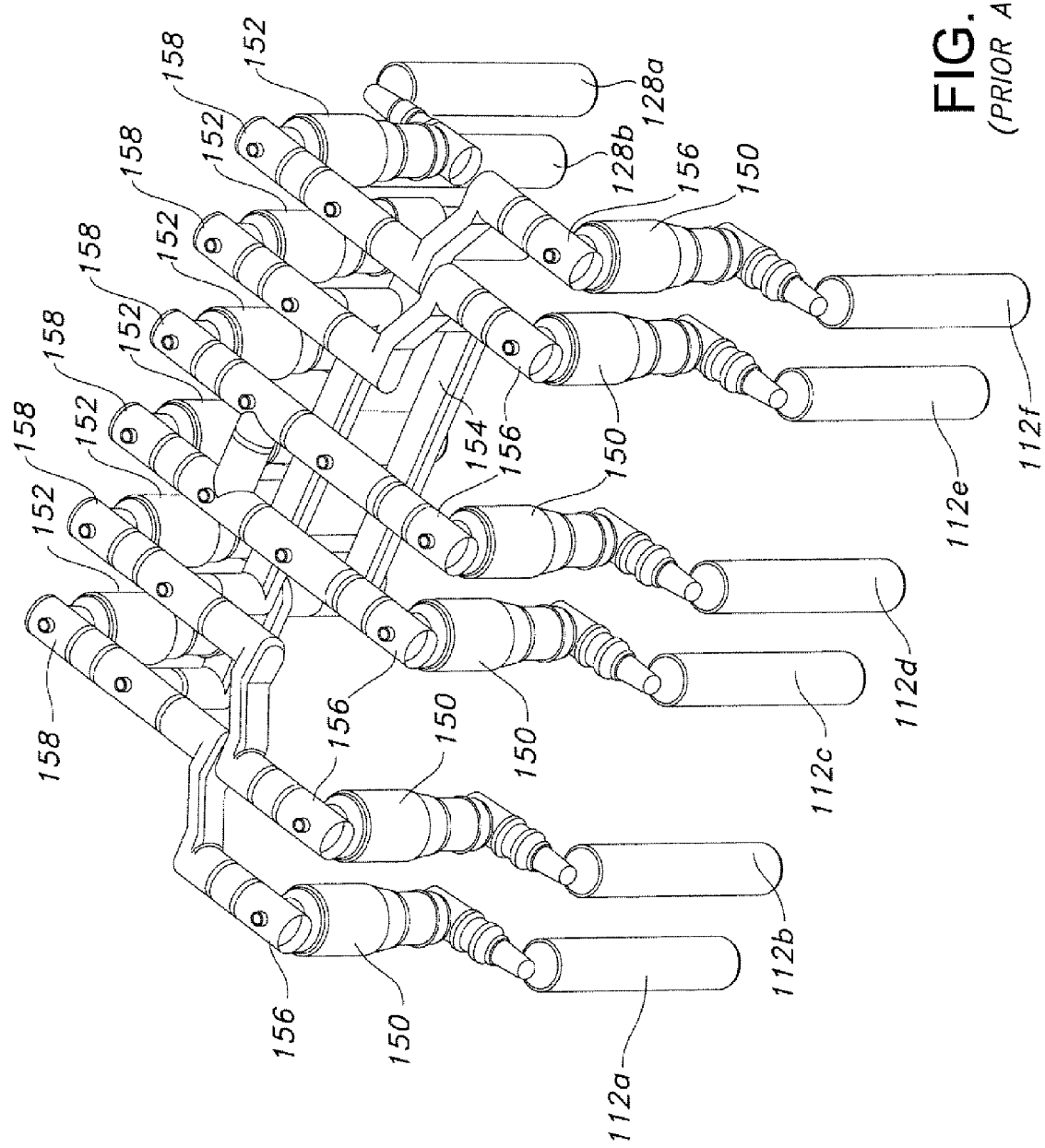
FIG. 3 is a perspective view of the internal components of the switchgear shown in FIGS. 1 and 2.

FIG. 3 is a perspective view of exemplary internal components of the switchgear 100 removed from the enclosure 102 and without the supporting frame. Switch element assemblies 150 and protective element assemblies 152 such as fuses, breakers, interrupter assemblies and the like may be positioned on opposites sides (i.e., the source side and the tap side, respectively) of the switchgear assembly. Cables 112a-112f may be connected to respective switch element assemblies 150, and cables 128a-128f of FIGS. 2 and 3 may be connected to the respective interrupter element assemblies 152.

A busbar system 154 may be situated in between and may interconnect the switch element or interrupter assemblies 150 and 152 via connectors 156 and 158. In different embodiments, the busbar system 154 includes conventional metal bar members formed or bent around one another, or a modular cable bus and connector system. The modular cable bus system may be assembled with mechanical and push-on connections into various configurations, orientations of phase planes, and sizes of busbar systems. In still another embodiment, molded solid dielectric busbar members may be provided in modular form with push-on mechanical connectors to facilitate various configurations of busbar systems with a reduced number of component parts. In still other embodiments, other known busbar systems may be employed as those in the art will appreciate.

When certain types of protective elements 152 are utilized in the switchgear, it may be necessary to replace the protective elements 152 as they operate to interrupt the circuit path. In particular, when fuses are utilized in the elements 152 and the fuse elements open a current path through the respective protective element 152, it must be removed and replaced to restore the electrical connection. In such a circumstance, an opened fuse remains at its operating voltage potential or rated voltage, but carries no load current because the current path through the fuse is opened. An opened fuse or fuses in the respective protective elements 152 may impair the full power service of the switchgear to some degree by interrupting or reducing power supply to loads and equipment directly connected to the opened fuse(s), while protective elements 152 that have not opened may continue to supply electrical power to other electrical loads and equipment.

Figure 4:
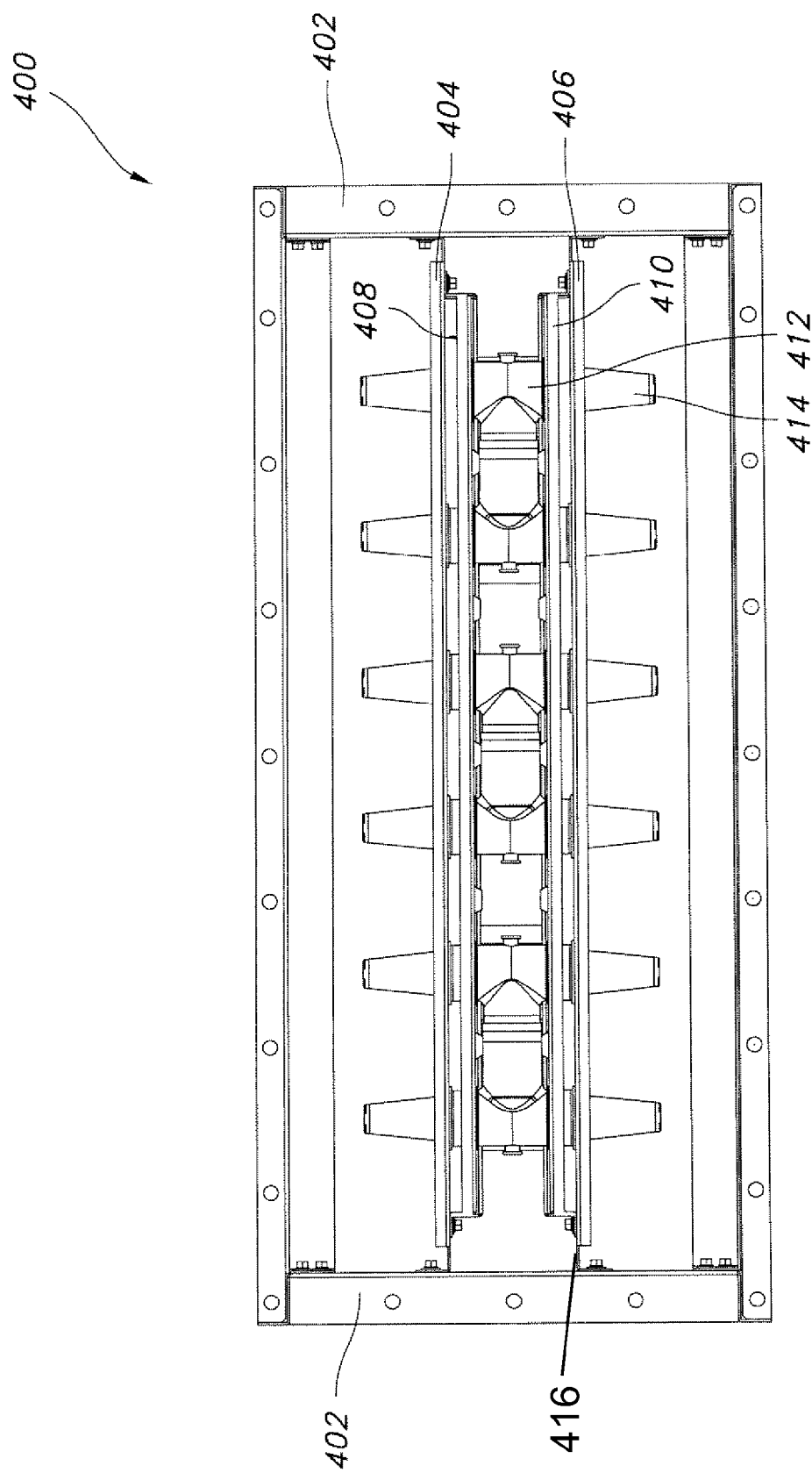
FIG. 4 is an overhead view of an exemplary bus support system presented in accordance with one exemplary embodiment of the present invention.

FIG. 4 is an overhead view of an exemplary bus support system 400 in accordance with one exemplary embodiment of the present invention. Now referring to FIG. 4, the exemplary bus support system 400 may include a support frame 402 capable of being positioned inside the enclosure 102. The support frame 402 may be made of steel or other metallic components and will be described in greater detail with reference to FIG. 5.

Figure 5:
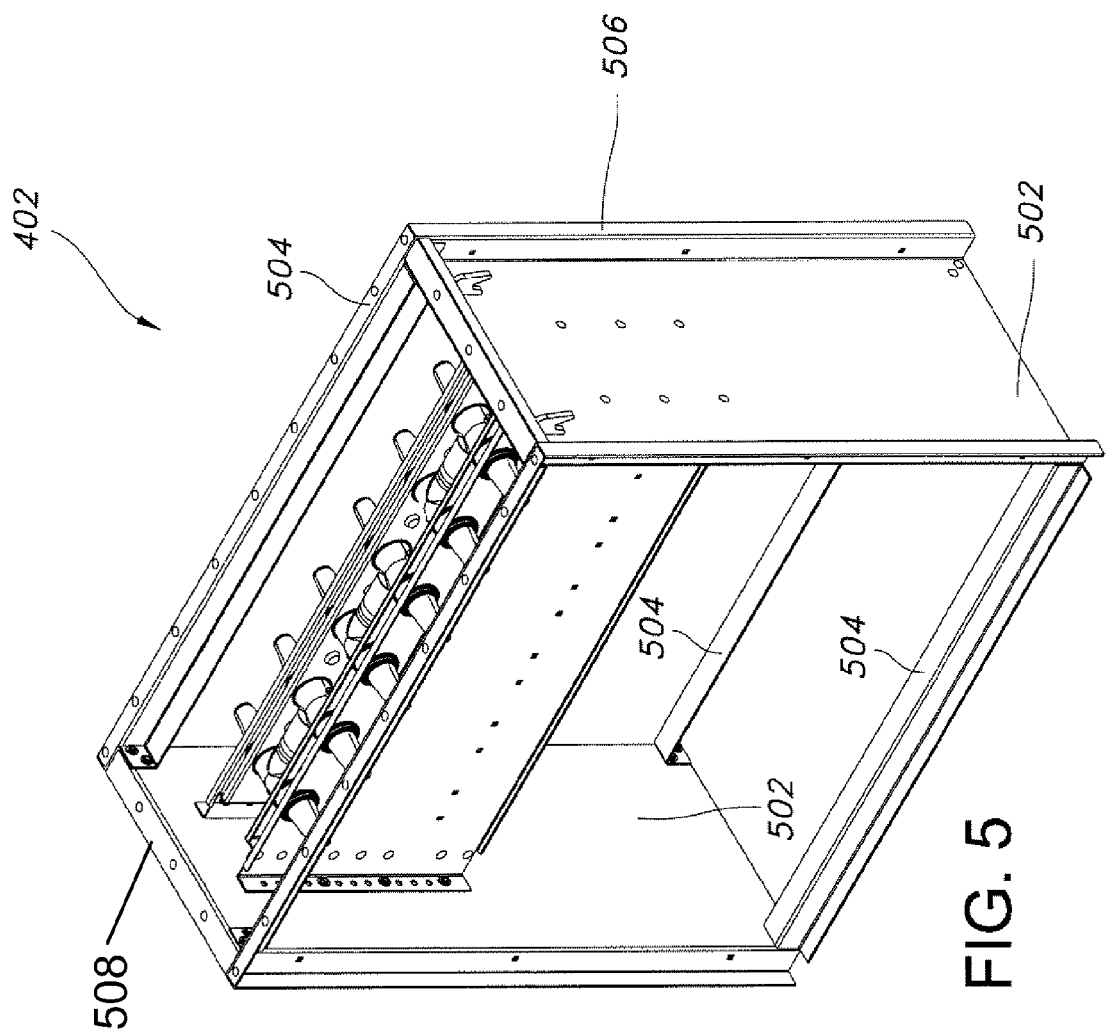
FIG. 5 is a perspective view of the support frame coupled to the bus support system presented in accordance with one exemplary embodiment of the present invention.

FIG. 5 presents a perspective view of the support frame 402 and bus support system 400 in accordance with one exemplary embodiment of the present invention. As shown and described in FIG. 5, the support frame may include one or more support plates 502 for supporting one end of the bus support system 400. In one exemplary embodiment, each of the support plates 502 is constructed of a metallic material and has a substantially rectangular shape. Each support plate may further include one or more vertical support members 506 extending along the vertical edge of the support plate 502 and one or more horizontal support members 508 extending along a horizontal edge of the support plate 502. Each of the vertical support members 506 and horizontal support members 508 may provide increased support strength for the support plate 502 as well as points of connection to the enclosure 102.

The support frame 402 may further include one or more horizontal frame supports 504. Each horizontal frame support 504 may be coupled along one longitudinal end to a first support plate 502 and coupled along an opposing longitudinal end to a second support plate 502. While the exemplary embodiment of FIG. 5 displays the horizontal frame supports 504 coupling the support plates 502 substantially along the four corners of each support plate 502, those of ordinary skill in the art will recognize that the point of attachment or coupling for each of the horizontal frame supports may be along any point within the surface area of the support plate 502 or the vertical 506 or horizontal support members 508.

Returning to FIG. 4, the exemplary bus support system 400 may further include a first support 404 positioned substantially perpendicular to each of the support plates 502 of the support frame 402. In one exemplary embodiment, the first support 404 may include a plate, which may be made of metal (hereinafter, the "first support," "first metallic plate" or "first plate"). While the exemplary embodiment shown presents the busbar between two supports 404, those of ordinary skill in the art will recognize that in an alternative embodiment, the busbar may be attached and supported by a single support 404 for supporting the remaining the active modules and bushings ("bus components") of the switchgear. In addition, under this alternative embodiment, the busbar may be further connected or restrained to the support 404 with U-straps or other methods of attachment or restraint known to those of ordinary skill in the art.

The first metallic plate 404 has a horizontal dimension that extends substantially along the length between the support plates 502 and has a vertical dimension that is typically less than the vertical dimension of each support plate 502. The support system 400 may also include a second support 406 positioned adjacent to the first metallic plate 404 and having substantially similar dimensions. In one exemplary embodiment, the second support 406 may be a plate which is made of metal (hereinafter, the "second plate," "second metallic plate" or "second support"). In one exemplary embodiment the first 404 and second 406 metallic plates may be positioned in a substantially parallel manner. Each of the metallic plates 404, 406 may be coupled to the support plates 502, either directly (not shown), through the use of brackets 416, by welding, or by other methods known to those of ordinary skill in the art.

The support system 400 may further include one or more secondary bus support brackets 408, 410 that are coupled on opposing ends by known attachment methods to and extend horizontally along one of the metallic support plates 404, 406. The secondary support brackets 408, 410 each include a plurality of cut-outs (or holes) (not shown in FIG. 4) along a surface area parallel to the surface area of the metallic support plates for slidably receiving and engaging buswork, such as a connector 412. In one exemplary embodiment, the connector 412 is a three-way connector, such as a male T-body rubber bus component; however several other variations of connector 412 (hereinafter "connector," "3-way connector," or "male T-body rubber bus component") or buswork known to those of ordinary skill in the art may be use to accomplish the same objective. Furthermore, while the exemplary connector 412 is presented as a T-shaped connector, other shapes and styles of connector known to those of ordinary skill in the are may be used within the scope of this invention. Each of the secondary support brackets 408 provide supplemental support for the busbar system 154.

Those of ordinary skill in the art will recognize that, while the exemplary system shown in FIG. 4 includes a pair of metallic support plates 404, 406 and a pair of secondary support brackets 408, 410, the exemplary bus support system 400 could include just the metallic support plates 404, 406, just the secondary support brackets 408, 410, the metallic support plate 404, 406 could be replaced with a support rod, a support bar having a vertical dimension that is less than the metallic support plate 404, 406 including a vertical dimension only marginally greater than the bus component that the bar is slidably affixed to, unistrut, or other supporting materials known to those of ordinary skill in the art.

The bus support system of FIG. 4 may further include the busbar system 154. The busbar system 154, as shown in FIG. 4 includes the male T-body rubber bus component 412 and a male energized break interface connector 414. The interface connector 414 may be slidably inserted through one of multiple cut-outs (or holes positioned along the surface area of one of the metallic bus plates 404, 406, such that each interface connector 414 extends through the metallic bus plate 404, 406 and the modules and bushings attached to the interface connector 414 will hang off of the interface connector 414 and be supported by the metallic bus plate 404, 406.

Figure 6:
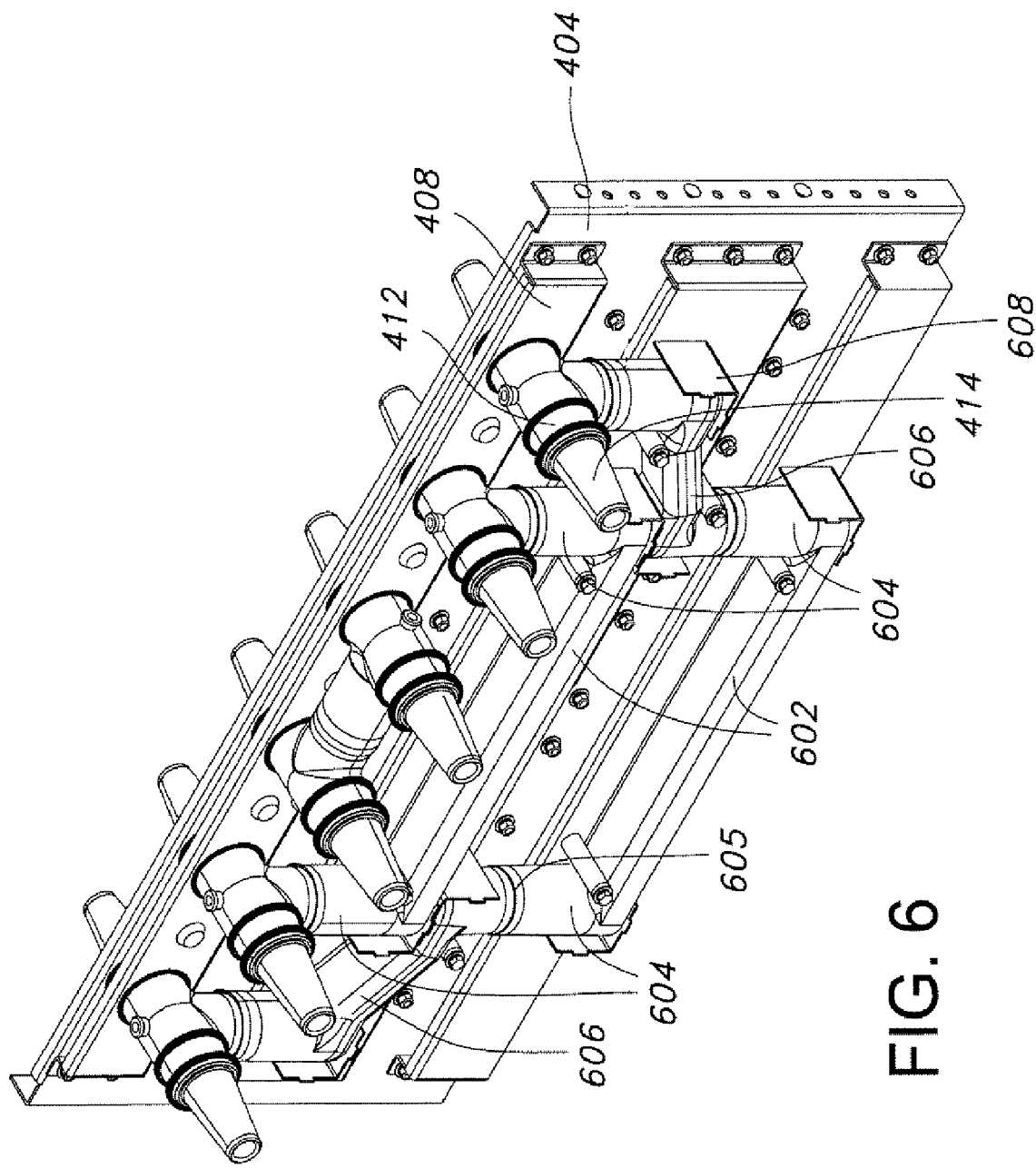
FIG. 6 is a perspective view of the busbar system positioned between the support plates of the exemplary bus support system presented in accordance with one exemplary embodiment of the present invention.
Figure 7:
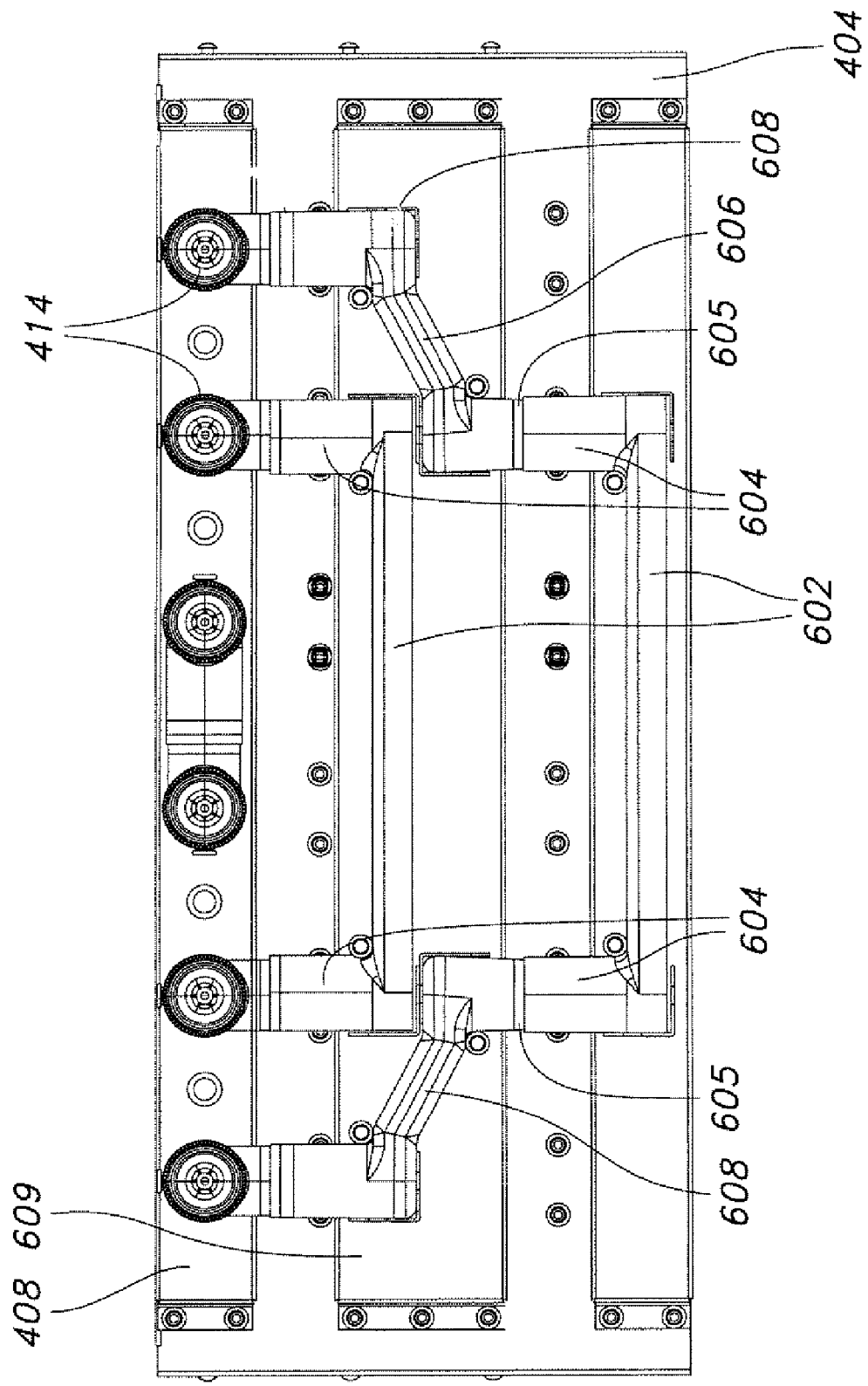
FIG. 7 is a frontal view of the busbar system positioned between the support plates of the exemplary bus support system presented in accordance with one exemplary embodiment of the present invention.

FIG. 6 is a perspective view and FIG. 7 is a frontal view of the busbar system 154 slidably affixed to one of the metallic bus plates 404, 406 but with the other plate 404, 406 removed for description purposes according to one exemplary embodiment of the present invention. Now referring to FIGS. 6 and 7, the busbar system 154 of the exemplary bus support system 400 can include one or more rubber insulated busbars 602. In one exemplary embodiment, the busbar 602 is a 24 U busbar.

The busbar 602 may include a female interface component 604. The female interface component 604 may be electrically coupled to a female interface 605 of a busbar. In one exemplary embodiment, the busbar may preferably be an 8Z bent insulated bus bar, which is described in greater detail in related U.S. patent application Ser. No. 11/688,648, filed Mar. 20, 2007, the entire contents of which are incorporated herein by reference. The female interface for the busbar 605 is integral to the busbar 606. The busbar 606 may include an exterior casing that may be mechanically coupled by known attachment methods to a bracket 608. The bracket 608 is typically coupled to the casing for the busbar 606 as well as a busbar support bracket 609. In one exemplary embodiment, the busbar support bracket 609 extends horizontally along the metallic bus plate 404, 406 along a plane substantially parallel to one of the busbars 602 and is mechanically coupled to the metallic bus plate 404, 406 through known attachment methods.

The busbar 606 may be mechanically and electrically coupled to the male T-body rubber bus component 412. In one exemplary embodiment, each male T-body rubber bus component 412 may be slidably coupled into a cut-out in the secondary bus support 408, 410. The male T-body rubber bus component 412 may include the male energized break interface component 414. The male energized break interface 414 may be slidably coupled through a cut-out in the metallic bus plate 404, 406 and/or the secondary bus support 408, 410. While an exemplary busbar system 154 has been described and shown in FIGS. 6 and 7, those of skill in the art will recognize that other configurations of busbar and other components may be included within the busbar system 154 and compressed between the metallic bus plates 404, 406 and still be contemplated within the exemplary bus support system 400.

Figure 8:
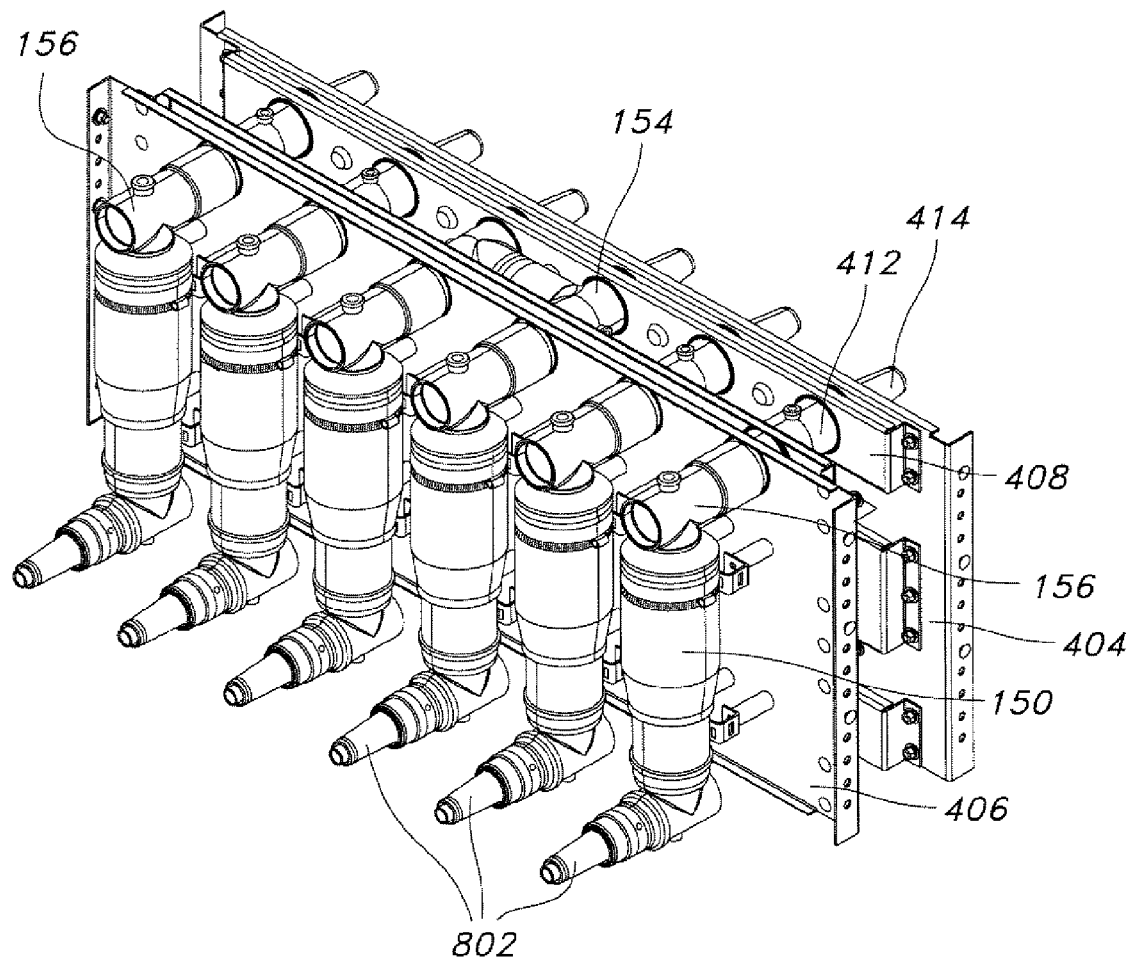
FIG. 8 is a perspective view of an opposing side of the exemplary bus system presented in accordance with one exemplary embodiment of the present invention.

FIG. 8 presents perspective view of an opposing side of the bus support system 400 in accordance with one exemplary embodiment of the present invention. Referring now to FIG. 8, the exemplary bus support system 400 includes one or more switch or fuse connectors 156 coupled to the T-body rubber bus component 412 and slidably coupled through a cut-out to one of the metallic bus plates 404, 406 and/or the secondary bus support bracket 408, 410. Each switch or fuse connector 156 includes a switch or fuse assembly 150, all of which hangs from rubber bus component 412. The connectors 156 and assembly 150 are supported by the bus component 412, which receives support from one of the bus plates 404, 406. The switches may then be electrically coupled to the cables 112 (Shown in FIGS. 2 and 3) by way of connectors 802.

Figure 9:
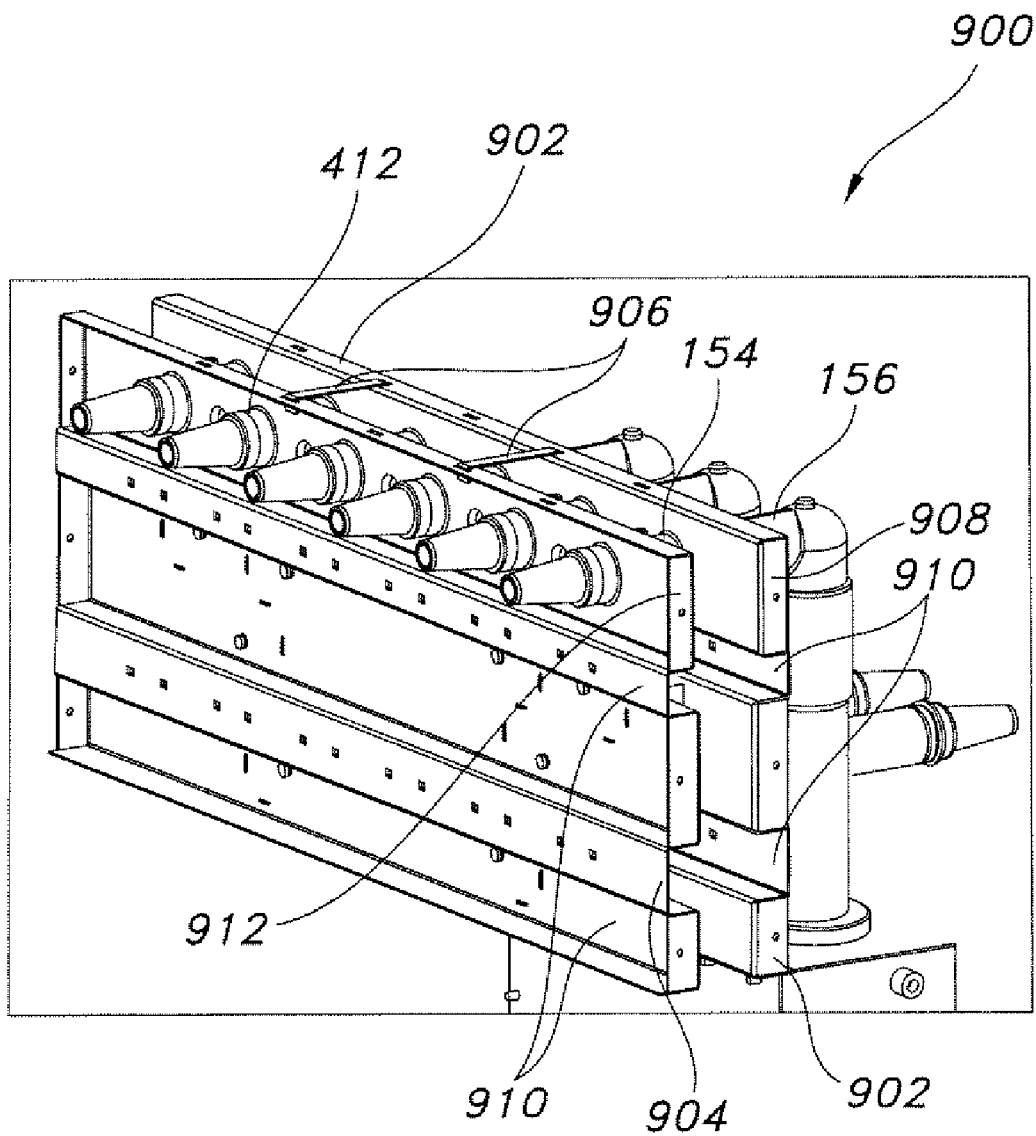
FIG. 9 is a perspective view of an alternative bus support system presented in accordance with one exemplary embodiment of the present invention.
Figure 10:
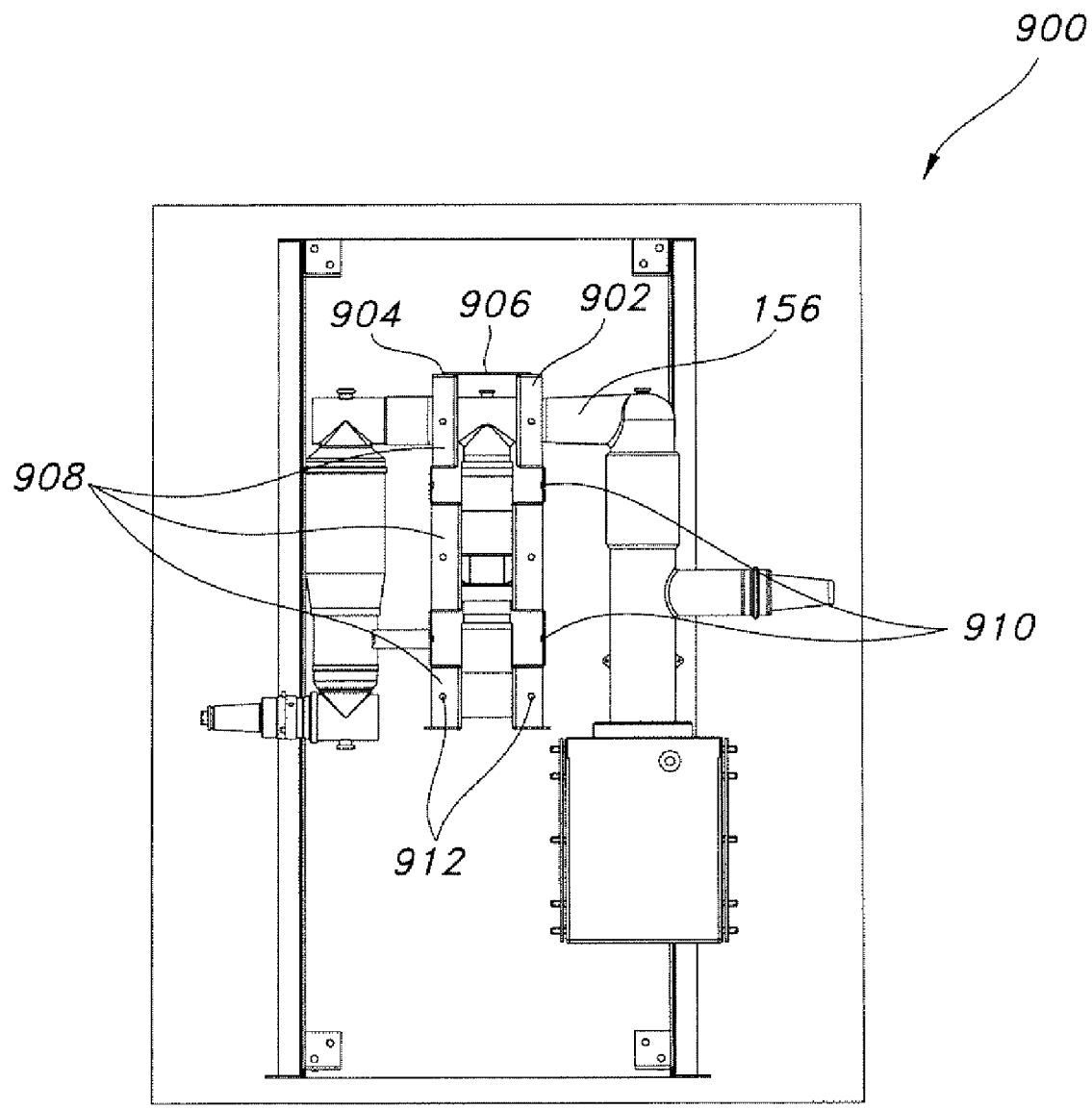
FIG. 10 is a side view of the alternative bus support system presented in accordance with one exemplary embodiment of the present invention.

FIG. 9 is a perspective view and FIG. 10 is a side view of an alternative bus support system 900, according to one exemplary embodiment of the present invention. Referring now to FIGS. 9 and 10, the alternative bus support system 900 presents the busbar system 154 positioned between a first bus plate 902 and a second bus plate 904. The bus plates 902 and 904 are typically made of a metallic material. The bus plates may include one or more slots for receiving a first end of fastener 906 in the first bus plate 902 and a second end of the fastener 906 in the second bus plate 904. The fastener 906 assists the bus plates 902, 904 to maintain a secure coupling on the male T-body rubber bus component 412 or the switch connector 156.

Each bus plate 902, 904 includes one or more support panels 908 horizontally separated by one or more support channels 910. Each support panel may include one or more cut-outs for slidably receiving a male energized break interface 414, male T-bar rubber bus component 412, switch connector 156, or other bus component known to those of ordinary skill in the art. Each support panel 908 may be solid or may be recessed along its depth, such that the perimeter of the support panel 908 will have a greater dimension than the interior of the support panel 908. Each support panel 908 typically extends horizontally between the support plates 502 of the support frame 402 of FIG. 5 and has a vertical height greater than the bus component to which it is slidably coupled. An alignment and/or mounting means, such as a pilot hole 912 or threaded connection may be positioned along each of the vertical edges of the support panel to support coupling the support panel 908 to one of the support plates 502 or to a bracket (not shown) that is further attached to one of the support plates 502.

The support channels 910 provide additional strength to the bus plate 902. Each support channel 910 typically has a horizontal dimension substantially equal to the horizontal dimension of the support panel 908 and may have a vertical dimension less than, greater than, or equal to the vertical dimension of the support panel 908. Each support channel 910 is typically coupled using known methods along an upper horizontal edge to a bottom horizontal edge of a support panel 908 and is coupled along a lower horizontal edge of the support channel 910 to an upper horizontal edge of another support panel 908 positioned below the support channel. In one exemplary embodiment, the support channel 910 is made of a flat metallic material, such as flatbar. In another exemplary embodiment, the support channel 910 is made of a metallic material and has a substantially block C-shape; however, solid supports, hollow channel or other forms of support known to those of skill in the art may be used between the support channels 910.

FIG. 10 is an exemplary illustration of the primary innovation, which is the bus is rigidly supported by the internal frame and the active elements and bushings are hanging from, and primarily supported by, the bus components themselves. This innovative arrangement is completely the opposite of all known conventional power distribution switchgear wherein the active elements and bushings are supported by an external frame or tank and the bus bars hang from, and are wholly supported by, the active switching elements and bushings.

Figure 11:
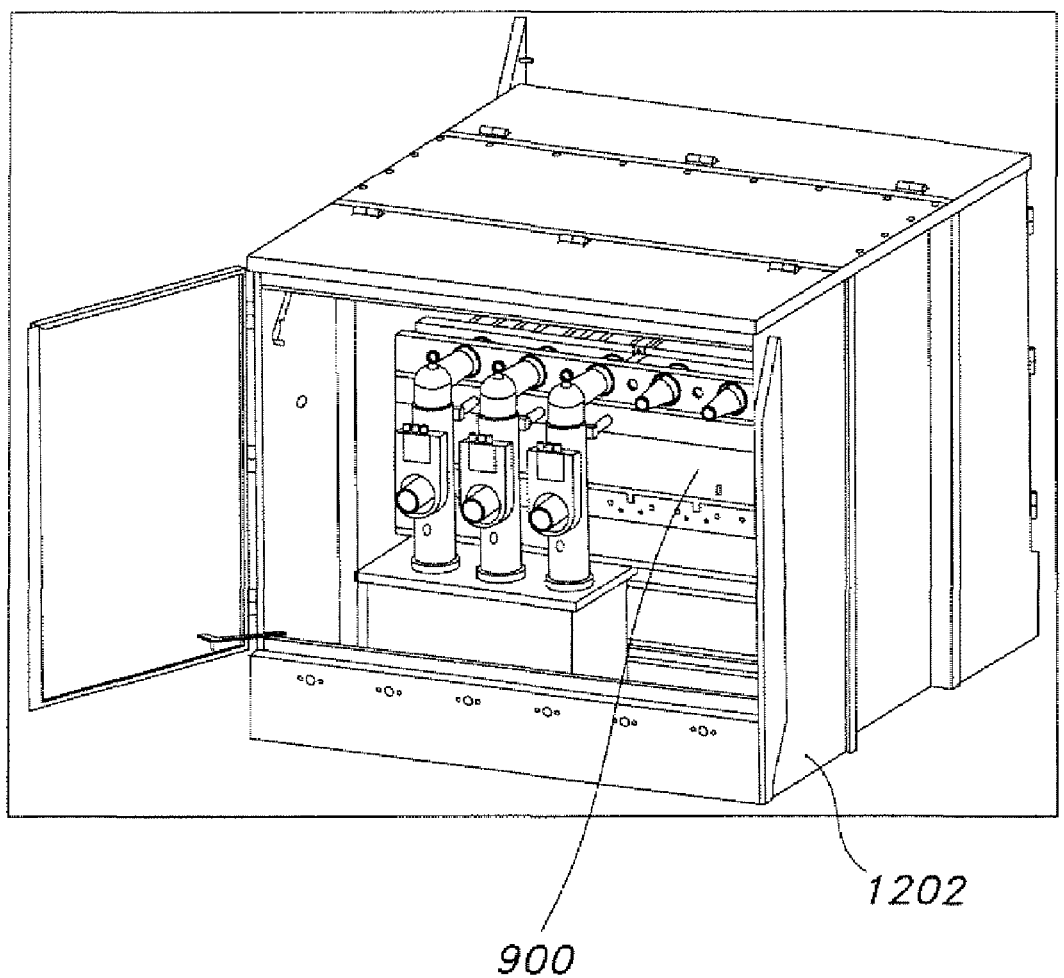
FIG. 11 is a perspective view of the interior of a switchgear enclosure that includes the exemplary bus support system presented in accordance with one exemplary embodiment of the present invention.

FIG. 11 is a perspective view of the exemplary bus support system 900 positioned inside an enclosure 1202. In one exemplary embodiment, the bus support system 900 is coupled to a support frame 402 as described in FIGS. 4 and 5 and the support frame is positioned inside of and coupled to the enclosure 1202. In an alternative embodiment, the support plates can be directly coupled to the enclosure 1202 by known attachment methods.

One advantage of the exemplary bus support systems described herein is the fact that, since the busbar system 154 is supported between a pair of internal bus support plates, instead of supporting the active switching elements or bushings along the frame of the enclosure and hanging the busbar system 154 off of the active switching elements in conventional switchgears, the exemplary bus support system may be manufactured inside out, such that a person can create the busbar system 154 and bus support system and couple the bus components to the busbar system and the busbar system to a frame support prior to placing the enclosure around the busbar and component pieces. This inside-out manufacturing allows for easier construction of the switchgear and bus components and increases the safety of the people manufacturing the switchgear, as they will no longer be required to complete the enclosure first and then enter a completed enclosure to begin the process of attaching the switchgear and busbar components individually inside the enclosure.

Figure 12:
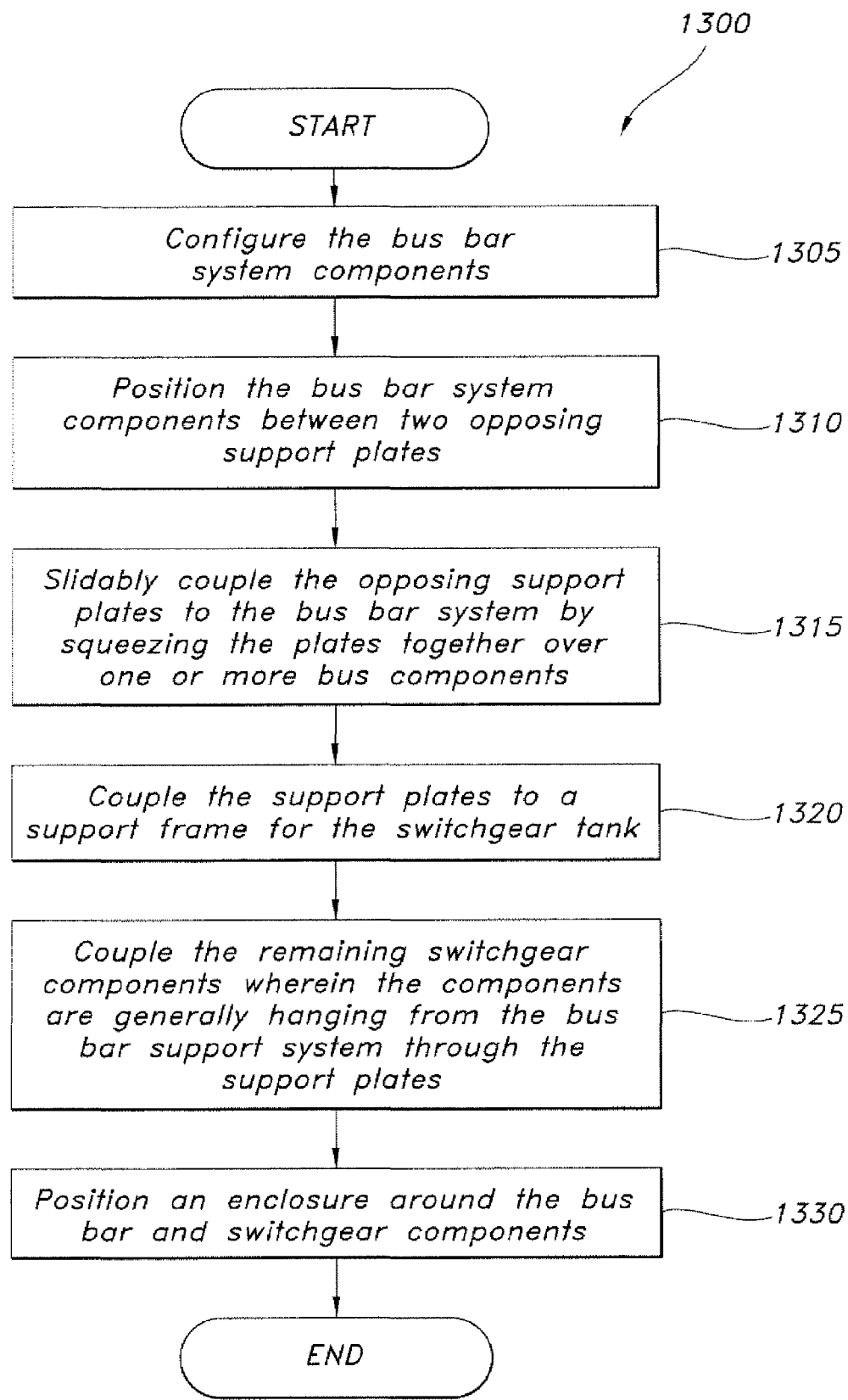
FIG. 12 is an exemplary method for building a switchgear that includes the exemplary bus support system in accordance with one exemplary embodiment of the present invention.

FIG. 12 is an exemplary method for building a switchgear that includes the exemplary bus support system according to one exemplary embodiment of the present invention. Referring now to FIG. 12, the exemplary method 1300 begins at the START step and continues to step 1305, where the busbar system components 154 are configured. The busbar system components 154 include all of the components that will be positioned between the two support plates.

In step 1310, the busbar system components 154 are positioned between two opposing support plates. As described in the preceding figures, the exemplary support plates may further include additional support brackets or may be constructed of coupled sections of support panels 908 and support channels 910. The busbar system 154 is slidably coupled between the support plates by squeezing the plates together over one or more bus components so that a portion of the components extent through cut-outs in the support plates in step 1315.

In step 1320, the support plates can be coupled to a support frame 402. In an alternative embodiment, the support plates can be directly coupled to the enclosure 1202 at another point in the manufacturing process. The remaining switchgear components are coupled such that the components are generally hanging from the busbar support system through the support plates in step 1325. In step 1330, an enclosure 1202 is positioned around the busbar and switchgear components and sealed. The process then continues to the END step.

Having now described various embodiments of the switchgear bus support system, it is recognized that further embodiments may be derived with straightforward modification of, and possibly combining aspects of, the embodiments illustrated in FIGS. 4-11. The illustrated embodiments are but a few examples of potential embodiments of switchgear bus support systems.

The inventive switchgear bus support systems may facilitate improved construction practices of the switchgear while increasing safety for the members of the crew constructing the switchgear by limiting the need to enter a sealed enclosure to construct and couple the components of the switchgear.

In one exemplary embodiment, a busbar support device for a switchgear has been described that includes a busbar; at least one buswork component coupled to the busbar; a first busbar support positioned along a first side of the busbar; and a second busbar support positioned along a second side of the busbar, wherein the busbar is coupled to at least one of the busbar supports and wherein the busbar is a primary support for a plurality of active modules and bushings electrically coupled to the busbar. In another exemplary embodiment, the buswork component further comprises at least one connection interface. In another exemplary embodiment, the first support comprises at least one opening, each opening capable of slidably receiving a first connection interface for one of the buswork components and the second support comprises at least one opening, each opening capable of slidably receiving a second connection interface for one of the buswork components. In another exemplary embodiment, the first and second connection interfaces of the buswork component further comprise an elastomeric insulating housing positioned around the exterior of the first and second connection interfaces. In another exemplary embodiment, the device further includes a first plurality of switchgear components electrically and mechanically coupled to a first connection interface, wherein the coupling of the first switchgear components allows the first switchgear components to be suspended from the first connection interface and supported by the first connection interface and the first busbar support without additional support for the first switchgear components; and a second plurality of switchgear components electrically and mechanically coupled to a second connection interface, wherein the coupling of the second switchgear components allows the second switchgear components to be suspended from the second connection interface and supported by the second connection interface and the second busbar support without additional support for the second switchgear components. In another exemplary embodiment, the first plurality of switchgear components comprises protective element assemblies. In another exemplary embodiment, the second plurality of switchgear components comprises switch assemblies. In another exemplary embodiment, the first busbar support and the second busbar support are substantially parallel. In another exemplary embodiment, the busbar is positioned between the first and second busbar supports. In another exemplary embodiment, the device further includes a support frame coupled to the first busbar support and the second busbar support, the support frame comprising a first frame support positioned along a first edge of the first and second busbar supports and substantially perpendicular to the first and second busbar supports, wherein the first frame support is coupled to the first edge of the first and second busbar supports; a second frame support positioned along a second edge of the first and second busbar supports and substantially perpendicular to the first and second busbar supports, wherein the second frame support is coupled to the second edge of the first and second busbar supports; and at least one frame support member, each member having a first end and a second end, the first end coupled to the first frame support and the second end coupled to the second frame support. In another exemplary embodiment, the first and second busbar supports have a vertical dimension substantially equal to the vertical dimension of the support frame. In another exemplary embodiment, the first and second busbar supports have a vertical dimension substantially less than the vertical dimension of the support frame. In another exemplary embodiment, the device further includes a first support member coupled to the first busbar support and extending horizontally across the first busbar support, wherein the first member comprises at least one opening, each opening capable of slidably receiving a first connection interface for one of the buswork components; a second support member coupled to the first busbar support and extending horizontally across the first busbar support, the second support member further coupled to at least a portion of the busbar; and a third support member coupled to the second busbar support and extending horizontally across the second busbar support, wherein the third member comprises at least one opening, each opening capable of slidably receiving a second connection interface for one of the buswork components. In another exemplary embodiment, the first and second busbar supports comprise unistrut. In another exemplary embodiment, the first and second busbar supports comprise a metallic plate. In another exemplary embodiment, the first and second busbar supports comprise a support bar positioned along the top edge of the first and second busbar support, wherein a first connection interface for a buswork component is positioned above and lies upon the support bar of the first busbar support and a second connection interface for a buswork component is positioned above and lies upon the support bar of the second busbar support. In another exemplary embodiment, the device further includes a female interface component having a first and a second side, the first side electrically coupled to the busbar; a female interface having a first and a second side, wherein the first side of the female interface is electrically coupled to the second side of the female interface component; a busbar having a first and a second side, wherein the first side of the busbar is electrically coupled to the second side of the female interface and wherein the second side of the busbar is electrically coupled to the buswork component. In another exemplary embodiment, the buswork component comprises a three-way connector. In another exemplary embodiment, the first and second busbar support comprise further includes a first support panel positioned along the first side of the busbar, the first panel comprising a first edge and a second edge, the second edge being below the first edge; a first support channel positioned below and parallel to the first support panel, the first support channel comprising a top edge and a bottom edge, the top edge of the first support channel coupled to the second edge of the first support panel; a second support panel positioned below and parallel to the first support channel, the second support panel comprising a top edge and a bottom edge, the top edge of the second support panel coupled to the bottom edge of the first support channel; a second support channel positioned below and parallel to the second support panel, the second support channel comprising a top edge and a bottom edge, the top edge of the second support channel coupled to the bottom edge of the second support panel; and a third support panel positioned below and parallel to the second support channel, the third support panel comprising a top edge and a bottom edge, the top edge of the third support panel coupled to the bottom edge of the second support channel; wherein at least one of the support panels further comprises at least one opening, each opening capable of slidably receiving a first connection or second connection interface for one of the buswork components. In another exemplary embodiment, a plurality of the support panels further comprise at least one opening, each opening capable of slidably receiving the first connection interface for one of the T-body bus components. In another exemplary embodiment, the busbar is coupled to at least one of the support panels. In another exemplary embodiment, the device further includes an enclosure positioned around and coupled to the busbar support system.

In one exemplary embodiment a busbar support device for a switchgear has been described that includes a means for conducting and distributing electricity through a common connection to a plurality of circuit means; at least one connection means electrically coupled to the conducting and distributing means, the connection means comprising at least two means for connecting and distributing the electricity to the plurality of circuit means; a first means for supporting the conducting and distributing means and the connection means positioned along a first side of the distributing means, the first support means comprising at least one means for slidably receiving the connection means; and a second means for supporting the distributing means and the connection means positioned along a second side of the distributing means, the second supporting means comprising at least one means for slidably receiving the connection means, wherein the distributing means is positioned between and coupled to the first and second supporting means, each connection means is slidably coupled into a corresponding receiving means and the first and second supporting means are substantially parallel. In another exemplary embodiment, the device further includes a means for supporting and framing the busbar support system, the framing means further comprising: a first framing panel means positioned along a first edge of the first and second supporting means and substantially perpendicular to the first and second supporting means, wherein the first framing panel means is coupled by coupling means to the first edge of the first and second supporting means; a second framing panel means positioned along a second edge of the first and second supporting means and substantially perpendicular to the first and second supporting means, wherein the second framing panel means is coupled by coupling means to the second edge of the first and second supporting means; a plurality of means for attaching the first and second framing panel means, each attachment means having a first end and a second end, the first end of the attachment means coupled to the first framing panel means and the second end of the attachment means coupled by coupling means to the second framing panel means and wherein each attachment means has a longitudinal axis that is substantially perpendicular to the first and second framing panel means. In another exemplary embodiment, the device further includes a first means for supporting the connection means coupled by coupling means to the first supporting means and extending across the surface area of the first supporting means, wherein the first connection support means comprises at least one means for slidably receiving the connection means; a means for supporting the distributing means coupled by coupling means to the first supporting means and extending across the surface area of the first supporting means; distributing support means coupled by coupling means to a portion of the distributing means; and a second means for supporting the connection means coupled by coupling means to the second supporting means and extending across the surface area of the second supporting means, wherein the second connection support means comprises at least one means for slidably receiving the connection means. In another exemplary embodiment, the first connection support means is positioned along the surface area of the first supporting means adjacent to the distributing means and the second connection supporting means is positioned along the surface area of the second supporting means adjacent to the distributing means. In another exemplary embodiment, the connection means further comprises a means for elastomerically insulating the connection means. In another exemplary embodiment, the device further includes a first means of transmitting electricity coupled by coupling means to the first connection means, wherein the transmitting means is suspended from the connection means and supported by the connection means and the first supporting means without additional support; and a second means of transmitting electricity coupled by coupling means to the second connection means, wherein the transmitting means is suspended from the connection means and supported by the connection means and the second supporting means without additional support. In another exemplary embodiment, the first and second supporting means further includes a first panel means positioned adjacent to the first side of the distributing means, the first panel means comprising a first edge and a second edge, the second edge being below the first edge; a first supplemental support means positioned below and parallel to the first panel means, the first supplemental support means comprising a top edge and a bottom edge, the top edge of the first supplemental support means coupled by coupling means to the second edge of the first panel means, wherein the first supplemental support means provides additional strength to the first or second supporting means; a second panel means positioned below and parallel to the first supplemental support means, a top edge of the second panel means coupled by coupling means to the bottom edge of the first supplemental support means; a second supplemental support means positioned below and parallel to the second panel means, the second supplemental support means comprising a top edge and a bottom edge, the top edge of the second supplemental support means coupled by coupling means to a bottom edge of the second panel means, wherein the second supplemental support means provides additional strength to the first or second supporting means; and a third panel means positioned below and parallel to the second supplemental support means, a top edge of the third panel means coupled by coupling means to the bottom edge of the second supplemental support means; wherein at least one of the panel means further comprises at least one means for slidably receiving the connection means. In another exemplary embodiment, a plurality of the panel means comprise at least one means for slidably receiving the connection means. In another exemplary embodiment, the device further includes a means for enclosing the busbar support system and protecting the system from the environmental elements.

In one exemplary embodiment, a busbar support device for a switchgear has been described that includes a busbar; at least one buswork component coupled to the busbar, wherein the buswork component further comprises at least one; a first busbar support positioned along a first side of the busbar; and a second busbar support positioned along a second side of the busbar, such that the busbar is positioned between the first and second busbar supports; wherein each busbar support comprises: a first support panel comprising a first edge and a second edge, the second edge positioned below the first edge; a first support channel positioned below and parallel to the first support panel, the first support channel comprising a top edge and a bottom edge, the top edge of the first support channel coupled to the second edge of the first support panel; a second support panel positioned below and parallel to the first support channel, the second support panel comprising a top edge and a bottom edge, the top edge of the second support panel coupled to the bottom edge of the first support channel; a second support channel positioned below and parallel to the second support panel, the second support channel comprising a top edge and a bottom edge, the top edge of the second support channel coupled to the bottom edge of the second support panel; and a third support panel positioned below and parallel to the second support channel, the third support panel comprising a top edge and a bottom edge, the top edge of the third support panel coupled to the bottom edge of the second support channel; wherein at least one of the support panels for each further comprises at least one opening, each opening capable of slidably receiving a first connection or a second connection interface for one of the buswork components. In another exemplary embodiment, the first busbar support and the second busbar support are substantially parallel. In another exemplary embodiment, the device further includes a support frame coupled to the first busbar support and the second busbar support, the support frame comprising: a first frame support positioned along a first edge of the first and second busbar supports and substantially perpendicular to the first and second busbar supports, wherein the first frame support is coupled to the first edge of the first and second busbar supports; a second frame support positioned along a second edge of the first and second busbar supports and substantially perpendicular to the first and second busbar supports, wherein the second frame support is coupled to the second edge of the first and second busbar supports; and at least one frame support member, each member having a first end and a second end, the first end coupled to the first frame support and the second end coupled to the second frame support. In another exemplary embodiment, the frame supports are coupled to the first and second busbar supports along a vertical edge of at least one support panel. In another exemplary embodiment, each frame support member has a longitudinal axis that is substantially perpendicular to the first and second frame supports. In another exemplary embodiment the first and second busbar supports have a vertical dimension substantially less than the vertical dimension of the support frame. In another exemplary embodiment, the first and second busbar supports comprise a metallic plate. In another exemplary embodiment, the buswork component comprises a three way connector that includes the first and second connection interfaces, wherein the first and second connection interfaces further comprise an elastomeric insulating housing covering the exterior of the first and second connection interfaces. In another exemplary embodiment, the device further includes a female interface component having a first and a second side, the first side electrically coupled to the busbar; a female interface having a first and a second side, wherein the first side of the female interface is electrically coupled to the second side of the female interface component; a busbar having a first and a second side, wherein the first side of the busbar is electrically coupled to the second side of the female interface and wherein the second side of the busbar is electrically coupled to the buswork component. In another exemplary embodiment, the device further includes a first plurality of switchgear components electrically and mechanically coupled to the first connection interface, wherein the coupling of the first switchgear components allows the first switchgear components to be suspended from the first connection interface and primarily supported by the busbar without additional support for the first switchgear components; and a second plurality of switchgear components electrically and mechanically coupled to the second connection interface, wherein the coupling of the second switchgear components allows the second switchgear components to be suspended from the second connection interface and primarily supported by the busbar without additional support for the second switchgear components. In another exemplary embodiment, the first plurality of switchgear components comprises protective element assemblies. In another exemplary embodiment, the second plurality of switchgear components comprises switch assemblies and switch connectors. In another exemplary embodiment, a plurality of the support panels further comprise at least one opening, each opening capable of slidably receiving the first connection interface for one of the buswork components. In another exemplary embodiment, the first and second support channels are selected from a group consisting of: flatbar, tubing, hollow channel, solid metallic members, and U-shaped channel, and I-beams. In another exemplary embodiment, the busbar is coupled to at least one of the support panels. In another exemplary embodiment, the device further includes an enclosure positioned around and coupled to the busbar support system.

In one exemplary embodiment, a method of manufacturing a busbar support device has been described that includes providing a first busbar support; attaching a busbar along a first side of the busbar to a portion of the first busbar support; attaching additional busbar components to the first busbar, wherein the additional components comprise at least one buswork component; positioning a second busbar support along a second side of the busbar; and providing a plurality of active modules and bushings electrically coupled to the buswork, wherein the busbar provides the primary support for the active modules and bushings. In another exemplary embodiment, the first busbar support comprises at least one opening capable of slidably receiving a first connection interface of the buswork component; wherein the second busbar support comprises at least one opening capably of slidably receiving a second connection interface of the buswork component; and wherein the method further comprises the step of slidably coupling the first and second busbar supports towards one another while slidably receiving the first connection interface in one of the openings of the first busbar support and slidably receiving the second connection interface in one of the openings of the second busbar support. In another exemplary embodiment, the method further includes the step of coupling additional switchgear components to the first and second connection interfaces for each of the buswork components, wherein the busbar provides the primary support for the additional switchgear components. In another exemplary embodiment, the coupled switchgear components are hung from each of the connection interfaces and wherein switchgear components coupled to the first connection interface are supported by the first busbar support and the first connection interface and the switchgear components coupled to the second connection interface are supported by the second busbar support and the second connection interface. In another exemplary embodiment, the method further includes the step of providing a support framework coupled to the first busbar support and the second busbar support. In another exemplary embodiment, the support framework includes a first frame support positioned along a first edge of the first and second busbar supports and substantially perpendicular to the first and second busbar supports, wherein the first frame support is coupled to the first edge of the first and second busbar supports; a second frame support positioned along a second edge of the first and second busbar supports and substantially perpendicular to the first and second busbar supports, wherein the second frame support is coupled to the second edge of the first and second busbar supports; and at least one frame support member, each member having a first end and a second end, the first end coupled to the first frame support and the second end coupled to the second frame support. In another exemplary embodiment, the method includes providing an enclosure around the busbar support system. In another exemplary embodiment, the additional busbar components further include a female interface component having a first and a second side, the first side electrically coupled to the busbar; a female interface having a first and a second side, wherein the first side of the female interface is electrically coupled to the second side of the female interface component; a busbar having a first and a second side, wherein the first side of the busbar is electrically coupled to the second side of the female interface and wherein the second side of the busbar is electrically coupled to the buswork component. In another exemplary embodiment, each of the first and second busbar supports include a first support panel comprising a first edge and a second edge, the second edge being below the first edge; a first support channel positioned below and substantially parallel to the first support panel, the first support channel comprising a top edge and a bottom edge, the top edge of the first support channel coupled to the second edge of the first support panel; a second support panel positioned below and substantially parallel to the first support channel, the second support panel comprising a top edge and a bottom edge, the top edge of the second support panel coupled to the bottom edge of the first support channel; a second support channel positioned below and substantially parallel to the second support panel, the second support channel comprising a top edge and a bottom edge, the top edge of the second support channel coupled to the bottom edge of the second support panel; and a third support panel positioned below and substantially parallel to the second support channel, the third support panel comprising a top edge and a bottom edge, the top edge of the third support panel coupled to the bottom edge of the second support channel; wherein at least one of the support panels further comprises at least one opening, each opening capable of slidably receiving a first connection or second connection interface for one of the buswork components. In another exemplary embodiment the first and second busbar supports further include a first support member coupled to the first busbar support and extending horizontally across the first busbar support, wherein the first member comprises at least one opening, each opening capable of slidably receiving a first connection interface for one of the buswork components; a second support member coupled to the first busbar support and extending horizontally across the first busbar support, the second support member further coupled to at least a portion of the busbar; and a third support member coupled to the second busbar support and extending horizontally across the second busbar support, wherein the first member comprises at least one opening, each opening capable of slidably receiving a second connection interface for one of the buswork components.

In one exemplary embodiment, a method of manufacturing a busbar support device has been described that includes the steps of providing a first means for support, wherein the first support means comprises at least one means for slidably receiving a connection means; coupling by coupling means a means for conducting and distributing electricity through a common connection to a plurality of circuit means to the first support means along a first side of the distributing means; electrically coupling by coupling means at least one connection means to the distributing means, the connection means comprising at least one means for connecting and distributing the electricity to the plurality of circuit means; and coupling by coupling means additional electrical transmission and switching means to the first and second connection means, wherein the additional transmission means is supported by the support means and the connection means without additional means for supporting the additional transmission means. In another exemplary embodiment, the method further includes the step of positioning a second means for supporting the distributing means and the connecting means along a second side of the distributing means, wherein the second support means comprises at least one means for slidably receiving the connection means. In another exemplary embodiment, the method further includes the step of slidably coupling the first and second support means towards one another while slidably receiving a first connection means in the receiving means of the first support means and slidably receiving a second connection means in the receiving means of the second support means to support the distributing means and connection means with the first and second support means. In another exemplary embodiment, the method further includes the step of providing a means for supporting and framing the busbar support system, the framing means comprising: a first framing panel means positioned along a first edge of the first and second supporting means and substantially perpendicular to the first and second supporting means, wherein the first framing panel means is coupled by coupling means to the first edge of the first and second supporting means; a second framing panel means positioned along a second edge of the first and second supporting means and substantially perpendicular to the first and second supporting means, wherein the second framing panel means is coupled by coupling means to the second edge of the first and second supporting means; a plurality of means for attaching the first and second framing panel means, each attachment means having a first end and a second end, the first end of the attachment means coupled to the first framing panel means and the second end of the attachment means coupled by coupling means to the second framing panel means and wherein each attachment means has a longitudinal axis that is substantially perpendicular to the first and second framing panel means. In another exemplary embodiment, the method further includes the step of providing a means for enclosing the busbar support system and protecting the system from the environmental elements. In another exemplary embodiment, the first and second support means comprise: a first panel means positioned adjacent to the first side of the distributing means, the first panel means comprising a first edge and a second edge, the second edge being below the first edge; a first supplemental support means positioned below and parallel to the first panel means, the first supplemental support means comprising a top edge and a bottom edge, the top edge of the first supplemental support means coupled by coupling means to the second edge of the first panel means, wherein the first supplemental support means provides additional strength to the first or second supporting means; a second panel means positioned below and parallel to the first supplemental support means, a top edge of the second panel means coupled by coupling means to the bottom edge of the first supplemental support means; a second supplemental support means positioned below and parallel to the second panel means, the second supplemental support means comprising a top edge and a bottom edge, the top edge of the second supplemental support means coupled by coupling means to a bottom edge of the second panel means, wherein the second supplemental support means provides additional strength to the first or second supporting means; and a third panel means positioned below and parallel to the second supplemental support means, a top edge of the third panel means coupled by coupling means to the bottom edge of the second supplemental support means; wherein at least one of the panel means further comprises at least one means for slidably receiving the connection means. In another exemplary embodiment, a plurality of the panel means comprise at least one means for slidably receiving the connection means.

In one exemplary embodiment, a system for power distribution has been described that includes a power generating means for generating electricity; a power transmission means electrically coupled on a first end to the power generating means; a first electrical isolation means electrically coupled to a second end of the power transmission means; an electrical transforming means electrically coupled to the first electrical isolation means and a second electrical isolation means, wherein each electrical isolation means comprises: a means for conducting and distributing electricity through a common connection to a plurality of circuit means; at least one connection means electrically coupled to the conducting and distributing means, the connection means comprising at least two means for connecting and distributing the electricity to the plurality of circuit means; a first means for supporting the conducting and distributing means and the connection means positioned along a first side of the distributing means, the first support means comprising at least one means for slidably receiving the connection means; and a second means for supporting the distributing means and the connection means positioned along a second side of the distributing means, the second supporting means comprising at least one means for slidably receiving the connection means, wherein the distributing means is positioned between and coupled to the first and second supporting means, each connection means is slidably coupled into a corresponding receiving means and the first and second supporting means are substantially parallel. In another exemplary embodiment, the system further includes a means for supporting and framing the busbar support system, the framing means further comprising: a first framing panel means positioned along a first edge of the first and second supporting means and substantially perpendicular to the first and second supporting means, wherein the first framing panel means is coupled by coupling means to the first edge of the first and second supporting means; a second framing panel means positioned along a second edge of the first and second supporting means and substantially perpendicular to the first and second supporting means, wherein the second framing panel means is coupled by coupling means to the second edge of the first and second supporting means; a plurality of means for attaching the first and second framing panel means, each attachment means having a first end and a second end, the first end of the attachment means coupled to the first framing panel means and the second end of the attachment means coupled by coupling means to the second framing panel means and wherein each attachment means has a longitudinal axis that is substantially perpendicular to the first and second framing panel means. In another exemplary embodiment, the system further includes a first means for supporting the connection means coupled by coupling means to the first supporting means and extending across the surface area of the first supporting means, wherein the first connection support means comprises at least one means for slidably receiving the connection means; a means for supporting the distributing means coupled by coupling means to the first supporting means and extending across the surface area of the first supporting means; distributing support means coupled by coupling means to a portion of the distributing means; and a second means for supporting the connection means coupled by coupling means to the second supporting means and extending across the surface area of the second supporting means, wherein the second connection support means comprises at least one means for slidably receiving the connection means. In another exemplary embodiment, the first connection support means is positioned along the surface area of the first supporting means adjacent to the distributing means and the second connection supporting means is positioned along the surface area of the second supporting means adjacent to the distributing means. In another exemplary embodiment, the connection means further comprises a means for elastomerically insulating the connection means. In another exemplary embodiment, the system further includes a first means of transmitting electricity coupled by coupling means to the first connection means, wherein the transmitting means is suspended from the connection means and supported by the connection means and the first supporting means without additional support; and a second means of transmitting electricity coupled by coupling means to the second connection means, wherein the transmitting means is suspended from the connection means and supported by the connection means and the second supporting means without additional support. In another exemplary embodiment, the first and second supporting means comprise: a first panel means positioned adjacent to the first side of the distributing means, the first panel means comprising a first edge and a second edge, the second edge being below the first edge; a first supplemental support means positioned below and parallel to the first panel means, the first supplemental support means comprising a top edge and a bottom edge, the top edge of the first supplemental support means coupled by coupling means to the second edge of the first panel means, wherein the first supplemental support means provides additional strength to the first or second supporting means; a second panel means positioned below and parallel to the first supplemental support means, a top edge of the second panel means coupled by coupling means to the bottom edge of the first supplemental support means; a second supplemental support means positioned below and parallel to the second panel means, the second supplemental support means comprising a top edge and a bottom edge, the top edge of the second supplemental support means coupled by coupling means to a bottom edge of the second panel means, wherein the second supplemental support means provides additional strength to the first or second supporting means; and a third panel means positioned below and parallel to the second supplemental support means, a top edge of the third panel means coupled by coupling means to the bottom edge of the second supplemental support means; wherein at least one of the panel means further comprises at least one means for slidably receiving the connection means. In another exemplary embodiment, the system further includes a means for enclosing the busbar support system and protecting the system from the environmental elements.

In one exemplary embodiment, a system for power distribution has been described that includes; a power generating plant for generating electrical power; at least one electrical transmission cable electrically coupled on a first end to the power generating plant; a high voltage switchgear electrically coupled to a second end of the electrical transmission cable; an electrical transformer electrically coupled to the high voltage switchgear and a lower voltage switchgear, wherein each switchgear comprises a bus support system comprising: a busbar; at least one T-body bus component coupled to the busbar, wherein the T-body bus component further comprises a first connection interface and a second connection interface; a first busbar support plate positioned along a first side of the busbar, the first plate comprising at least one opening, each opening capable of slidably receiving the first connection interface for one of the T-body bus components; and a second busbar support plate positioned along a second side of the busbar, the second plate comprising at least one opening, each opening capable of slidably receiving the second connection interface for one of the T-body bus components. In another exemplary embodiment, the busbar is positioned between the first and second busbar support plates and the first and second busbar support plates are substantially parallel to one another. In another exemplary embodiment, the system further includes a support frame coupled to the first busbar support plate and the second busbar support plate, the support frame comprising: a first frame support plate positioned along a first edge of the first and second busbar support plates and substantially perpendicular to the first and second busbar support plates, wherein the first frame support plate is coupled to the first edge of the first and second busbar support plates; a second frame support plate positioned along a second edge of the first and second busbar support plates and substantially perpendicular to the first and second busbar support plates, wherein the second frame support plate is coupled to the second edge of the first and second busbar support plates; and at least one frame support member, each member having a first end and a second end, the first end coupled to the first frame support plate and the second end coupled to the second frame support plate. In another exemplary embodiment, the system further includes a first support member coupled to the first busbar support plate and extending horizontally across the first busbar support plate, wherein the first member comprises at least one opening, each opening capable of slidably receiving the first connection interface for one of the T-body bus components; a second support member coupled to the first busbar support plate and extending horizontally across the first busbar support plate, the second support member further coupled to at least a portion of the busbar; and a third support member coupled to the second busbar support plate and extending horizontally across the second busbar support plate, wherein the first member comprises at least one opening, each opening capable of slidably receiving the second connection interface for one of the T-body bus components. In another exemplary embodiment, the first support member is positioned on the side of the first busbar support plate adjacent to the busbar and the third support member is positioned on the side of the second busbar support plate adjacent to the busbar. In another exemplary embodiment, the first and second connection interfaces of the T-body bus component further comprise an elastomeric insulating housing positioned around the exterior of the first and second connection interfaces. In another exemplary embodiment, the busbar further comprises: a female interface component having a first and a second side, the first side electrically coupled to the busbar; a female interface having a first and a second side, wherein the first side of the female interface is electrically coupled to the second side of the female interface component; a busbar having a first and a second side, wherein the first side of the busbar is electrically coupled to the second side of the female interface and wherein the second side of the busbar is electrically coupled to the T-body bus component. In another exemplary embodiment, the system further includes a first plurality of switchgear components electrically and mechanically coupled to the first connection interface, wherein the coupling of the first switchgear components allows the first switchgear components to be suspended from the first connection interface and supported by the first connection interface and the first busbar support plate without additional support for the first switchgear components; and a second plurality of switchgear components electrically and mechanically coupled to the second connection interface, wherein the coupling of the second switchgear components allows the second switchgear components to be suspended from the second connection interface and supported by the second connection interface and the second busbar support plate without additional support for the second switchgear components. In another exemplary embodiment, the first and second busbar support plates comprise: a first support panel positioned along the first side of the busbar, the first panel comprising a first edge and a second edge, the second edge being below the first edge; a first support channel positioned below and parallel to the first support panel, the first support channel comprising a top edge and a bottom edge, the top edge of the first support channel coupled to the second edge of the first support panel; a second support panel positioned below and parallel to the first support channel, the second support panel comprising a top edge and a bottom edge, the top edge of the second support panel coupled to the bottom edge of the first support channel; a second support channel positioned below and parallel to the second support panel, the second support channel comprising a top edge and a bottom edge, the top edge of the second support channel coupled to the bottom edge of the second support panel; and a third support panel positioned below and parallel to the second support channel, the third support panel comprising a top edge and a bottom edge, the top edge of the third support panel coupled to the bottom edge of the second support channel; wherein at least one of the support panels further comprises at least one opening, each opening capable of slidably receiving the first connection or second connection interface for one of the T-body bus components. In another exemplary embodiment, a plurality of the support panels further comprise at least one opening, each opening capable of slidably receiving the first connection interface for one of the T-body bus components. In another exemplary embodiment, the first and second support channels are selected from a group consisting of: flatbar, tubing, hollow channel, solid metallic members, and U-shaped channel, and I-beams. In another exemplary embodiment, the busbar is coupled to at least one of the support panels. In another exemplary embodiment, the system further includes an enclosure positioned around and coupled to the busbar support system.

In one exemplary embodiment, a busbar support device for a switchgear has been described that includes a busbar comprising: a female interface component having a first and a second side, the first side electrically coupled to the busbar; a female interface having a first and a second side, wherein the first side of the female interface is electrically coupled to the second side of the female interface component; a busbar having a first and a second side, wherein the first side of the busbar is electrically coupled to the second side of the female interface and wherein the second side of the busbar is electrically coupled to a T-body bus component; at least one T-body bus component coupled to the busbar, wherein the T-body bus component comprises a first connection interface and a second connection interface each connection interface further comprising an elastomeric insulating housing positioned around the exterior of connection interface; a first metallic busbar support plate positioned along a first side of the busbar, the first plate comprising at least one opening, each opening capable of slidably receiving the first connection interface for one of the T-body bus components; a second metallic busbar support plate positioned substantially parallel to the first busbar support plate and along a second side of the busbar, wherein the busbar is positioned between the first and second busbar support plates, the second plate comprising at least one opening, each opening capable of slidably receiving the second connection interface for one of the T-body bus components; a support frame coupled to the first busbar support plate and the second busbar support plate, the support frame comprising: a first frame support plate positioned along a first edge of the first and second busbar support plates and substantially perpendicular to the first and second busbar support plates, wherein the first frame support plate is coupled to the first edge of the first and second busbar support plates; a second frame support plate positioned along a second edge of the first and second busbar support plates and substantially perpendicular to the first and second busbar support plates, wherein the second frame support plate is coupled to the second edge of the first and second busbar support plates; and at least one frame support member, each member having a first end and a second end, the first end coupled to the first frame support plate and the second end coupled to the second frame support plate; wherein each frame support member has a longitudinal axis that is substantially perpendicular to the first and second frame support plates; and wherein the first and second busbar support plates have a vertical dimension substantially equal to the vertical dimension of the support frame; a first plurality of switchgear components electrically and mechanically coupled to the first connection interface, wherein the coupling of the first switchgear components allows the first switchgear components to be suspended from the first connection interface and supported by the first connection interface and the first busbar support plate without additional support for the first switchgear components; and a second plurality of switchgear components electrically and mechanically coupled to the second connection interface, wherein the coupling of the second switchgear components allows the second switchgear components to be suspended from the second connection interface and supported by the second connection interface and the second busbar support plate without additional support for the second switchgear components; and an enclosure positioned around support frame and busbar support system and coupled to the support frame. In another exemplary embodiment, the device further includes a first support member coupled to the first busbar support plate and extending horizontally across the first busbar support plate, wherein the first member comprises at least one opening, each opening capable of slidably receiving the first connection interface for one of the T-body bus components; a second support member coupled to the first busbar support plate and extending horizontally across the first busbar support plate, the second support member further coupled to at least a portion of the busbar; and a third support member coupled to the second busbar support plate and extending horizontally across the second busbar support plate, wherein the first member comprises at least one opening, each opening capable of slidably receiving the second connection interface for one of the T-body bus components. In another exemplary embodiment, the first support member is positioned on the side of the first busbar support plate adjacent to the busbar and the third support member is positioned on the side of the second busbar support plate adjacent to the busbar.

In one exemplary embodiment, a busbar support device for a switchgear has been described that includes a busbar; a plurality of busbar components electrically coupled to the busbar; and a support structure, wherein the busbar is coupled to the support structure and the busbar provides the primary support for the plurality of busbar components. In another exemplary embodiment, the plurality of busbar components comprises bushings. In another exemplary embodiment, the plurality of busbar components comprises active modules. In another exemplary embodiment, the busbar is directly coupled to the support structure, the busbar further comprising: at least one buswork, wherein the buswork is electrically coupled to at least a portion of the plurality of busbar components and the electrically coupled busbar components receive primary support from the support structure through coupling to the buswork. In another exemplary embodiment, the support structure comprises a metallic plate.

In one exemplary embodiment, a method of manufacturing a busbar support system has been described that includes providing a busbar support; attaching a busbar to the busbar support; providing a plurality of buswork electrically coupled to the busbar; and providing a plurality of active modules and bushings electrically coupled to the buswork, wherein the busbar provides the primary support for the active modules and bushings. In another exemplary embodiment, the method further includes a second busbar support, wherein the busbar support is positioned on a first side of the busbar and the second busbar support is positioned on a second side of the busbar opposite the first side, whereby the busbar is positioned between the busbar support and second busbar support.

While the novel aspects have been described in terms of various specific embodiments, those skilled in the art will recognize that these aspects can be practiced with modification within the spirit and scope of the claims.

What is claimed is:

1. A busbar support system for a switchgear, comprising:
at least one busbar, each busbar being encapsulated within a solid dielectric medium, each busbar comprising at least one connection interface;
a first busbar support positioned along a first side of the busbar;
a second busbar support positioned along a second side of the busbar, wherein the busbar is coupled to at least one of the busbar supports, and wherein the busbar provides support for a plurality of active modules electrically coupled to the busbar; and
a plurality of switchgear components electrically and mechanically coupled to the connection interface, the switchgear components being suspended from the connection interface and supported by the connection interface and the first busbar support without additional support for the switchgear components.

2. The busbar support system of claim 1, wherein the first busbar support comprises at least one opening, each opening configured to slidably receive a connection interface for the busbar.

3. The busbar support system of claim 1, further comprising:
a support frame coupled to the first busbar support and the second busbar support, the support frame comprising:
a first frame support positioned along a first edge of the first and second busbar supports and substantially perpendicular to the first and second busbar supports, wherein the first frame support is coupled to the first edge of the first and second busbar supports;
a second frame support positioned along a second edge of the first and second busbar supports and substantially perpendicular to the first and second busbar supports, wherein the second frame support is coupled to the second edge of the first and second busbar supports; and
at least one frame support member, each frame support member having a first end and a second end, the first end coupled to the first frame support and the second end coupled to the second frame support.

4. The busbar support system of claim 1, wherein each of the first and second busbar supports comprises a metallic plate.

5. The busbar support system of claim 1, further comprising:
a first support bar positioned along a top edge of the first busbar support; and
a second support bar positioned along a top edge of the second busbar support,
wherein a first connection interface for a buswork component is positioned above and lies upon the first support bar, and a second connection interface for another buswork component is positioned above and lies upon the second support bar.

6. The busbar support system of claim 1, further comprising a ground plane positioned along the exterior of the solid dielectric medium.

7. The busbar support system of claim 1, wherein each of the first busbar support and the second busbar support comprises:
a first support panel positioned along the first side of the busbar, the first support panel comprising a first edge and a second edge, the second edge being below the first edge;
a first support channel positioned below and parallel to the first support panel, the first support channel comprising a top edge and a bottom edge, the top edge of the first support channel coupled to the second edge of the first support panel;
a second support panel positioned below and parallel to the first support channel, the second support panel comprising a top edge and a bottom edge, the top edge of the second support panel coupled to the bottom edge of the first support channel;
a second support channel positioned below and parallel to the second support panel, the second support channel comprising a top edge and a bottom edge, the top edge of the second support channel coupled to the bottom edge of the second support panel; and
a third support panel positioned below and parallel to the second support channel, the third support panel comprising a top edge and a bottom edge, the top edge of the third support panel coupled to the bottom edge of the second support channel;
wherein at least one of the support panels further comprises at least one opening, each opening configured to slidably receive a connection interface for the busbar.

8. The busbar support system of claim 1, wherein the busbar is configured to be rated to be energized to at least 5000 volts and carry at least 200 Amps of current.

9. The busbar support system of claim 1, wherein the active modules are encapsulated within the solid dielectric medium.

10. The busbar support system of claim 1, wherein the second busbar support comprises at least one opening, each opening configured to slidably receive a second connection interface for the busbar.

11. The busbar support system of claim 1, further comprising a second plurality of switchgear components electrically and mechanically coupled to a second connection interface, wherein the second switchgear components are suspended from the second connection interface and supported by the second connection interface and the second busbar support without additional support for the second switchgear components.

12. A busbar support system for a switchgear, comprising:
a means for conducting and distributing electricity through a common connection to a plurality of circuit means;
at least one connection means electrically coupled to the conducting and distributing means, the connection means comprising at least two means for connecting and distributing the electricity to the plurality of circuit means;
a first means for supporting the conducting and distributing means and the connection means positioned along a first side of the distributing means, the first support means comprising at least one means for slidably receiving the connection means; and
a second means for supporting the distributing means and the connection means positioned along a second side of the distributing means, the second supporting means comprising at least one means for slidably receiving the connection means, wherein the distributing means is positioned between and coupled to the first and second supporting means, each connection means being slidably coupled into a corresponding receiving means, wherein the first and second supporting means are substantially parallel.

13. A busbar support system for a switchgear comprising:
a busbar;

at least one buswork component coupled to the busbar, wherein the buswork component further comprises at least one connection interface;
a first busbar support positioned along a first side of the busbar; and
a second busbar support positioned along a second side of the busbar, such that the busbar is positioned between the first and second busbar supports;
wherein each busbar support comprises:
  a first support panel comprising a first edge and a second edge, the second edge positioned below the first edge;
  a first support channel positioned below and parallel to the first support panel, the first support channel comprising a top edge and a bottom edge, the top edge of the first support channel coupled to the second edge of the first support panel;
  a second support panel positioned below and parallel to the first support channel, the second support panel comprising a top edge and a bottom edge, the top edge of the second support panel coupled to the bottom edge of the first support channel;
  a second support channel positioned below and parallel to the second support panel, the second support channel comprising a top edge and a bottom edge, the top edge of the second support channel coupled to the bottom edge of the second support panel; and
  a third support panel positioned below and parallel to the second support channel, the third support panel comprising a top edge and a bottom edge, the top edge of the third support panel coupled to the bottom edge of the second support channel;
  wherein at least one of the support panels for each busbar support further comprises at least one opening, each opening configured to slidably receive a connection interface for one of the buswork components.

14. A method of manufacturing a busbar support system, comprising the steps of:
  providing a first means for support, wherein the first support means comprises at least one means for slidably receiving a connection means;
  coupling by coupling means a means for conducting and distributing electricity through a common connection to a plurality of circuit means to the first support means along a first side of the distributing means;
  electrically coupling by coupling means at least one connection means to the distributing means, the connection means comprising at least one means for connecting and distributing the electricity to the plurality of circuit means; and
  coupling by coupling means additional electrical transmission and switching means to the first and second connection means, wherein the additional transmission means is supported by the support means and the connection means without additional means for supporting the additional transmission means.

15. A system for power distribution, comprising;
a power generating means for generating electricity;
a power transmission means electrically coupled on a first end to the power generating means;
a first electrical isolation means electrically coupled to a second end of the power transmission means; and
an electrical transforming means electrically coupled to the first electrical isolation means and a second electrical isolation means, wherein each electrical isolation means comprises:
  a means for conducting and distributing electricity through a common connection to a plurality of circuit means;
  at least one connection means electrically coupled to the conducting and distributing means, the connection means comprising at least two means for connecting and distributing the electricity to the plurality of circuit means;
  a first means for supporting the conducting and distributing means and the connection means positioned along a first side of the distributing means, the first support means comprising at least one means for slidably receiving the connection means; and
  a second means for supporting the distributing means and the connection means positioned along a second side of the distributing means, the second supporting means comprising at least one means for slidably receiving the connection means, wherein the distributing means is positioned between and coupled to the first and second supporting means, each connection means is slidably coupled into a corresponding receiving means and the first and second supporting means are substantially parallel.

16. A system for power distribution, comprising;
a power generating plant for generating electrical power;
at least one electrical transmission cable electrically coupled on a first end to the power generating plant;
a high voltage switchgear electrically coupled to a second end of the electrical transmission cable; and
an electrical transformer electrically coupled to the high voltage switchgear and a lower voltage switchgear, wherein each switchgear comprises a bus support system comprising:
  a busbar;
  at least one T-body bus component coupled to the busbar, wherein the T-body bus component further comprises a first connection interface and a second connection interface;
  a first busbar support plate positioned along a first side of the busbar, the first plate comprising at least one opening, each opening capable of slidably receiving the first connection interface for one of the T-body bus components; and
  a second busbar support plate positioned along a second side of the busbar, the second plate comprising at least one opening, each opening capable of slidably receiving the second connection interface for one of the T-body bus components.

17. A busbar support system for a switchgear, comprising:
a busbar having a first side and a second side and comprising:
  a female interface component having a first side and a second side, the first side of the female interface component being electrically coupled to the busbar, and
  a female interface having a first side and a second side, the first side of the female interface being electrically coupled to the second side of the female interface component, wherein the first side of the busbar is electrically coupled to the second side of the female interface, and the second side of the busbar is electrically coupled to a T-body bus component;
at least one T-body bus component coupled to the busbar, wherein the T-body bus component comprises a first connection interface and a second connection interface, each connection interface comprising an elastomeric insulating housing positioned around the exterior of the connection interface;

a first metallic busbar support plate positioned along the first side of the busbar, the first busbar support plate comprising at least one opening, each opening configured to slidably receive the first connection interface for one of the T-body bus components;

a second metallic busbar support plate positioned substantially parallel to the first busbar support plate and along the second side of the busbar, wherein the busbar is positioned between the first and second busbar support plates, the second busbar support plate comprising at least one opening, each opening configured to slidably receive the second connection interface for one of the T-body bus components;

a support frame coupled to the first busbar support plate and the second busbar support plate, the support frame comprising:

a first frame support plate positioned along a first edge of the first and second busbar support plates and substantially perpendicular to the first and second busbar support plates, wherein the first frame support plate is coupled to the first edge of the first and second busbar support plates;

a second frame support plate positioned along a second edge of the first and second busbar support plates and substantially perpendicular to the first and second busbar support plates, wherein the second frame support plate is coupled to the second edge of the first and second busbar support plates; and at least one frame support member, each frame support member having a first end and a second end, the first end coupled to the first frame support plate and the second end coupled to the second frame support plate, wherein each frame support member has a longitudinal axis that is substantially perpendicular to the first and second frame support plates, and each of the first and second busbar support plates has a vertical dimension substantially equal to a vertical dimension of the support frame;

a first plurality of switchgear components electrically and mechanically coupled to the first connection interface, wherein the coupling of the first switchgear components allows the first switchgear components to be suspended from the first connection interface and supported by the first connection interface and the first busbar support plate without additional support for the first switchgear components;

a second plurality of switchgear components electrically and mechanically coupled to the second connection interface, wherein the coupling of the second switchgear components allows the second switchgear components to be suspended from the second connection interface and supported by the second connection interface and the second busbar support plate without additional support for the second switchgear components; and an enclosure positioned around the support frame and busbar support system and coupled to the support frame.

18. A busbar support system for a switchgear, comprising:

at least one busbar, each busbar comprising a connection interface;

a first busbar support positioned along a first side of the busbar and comprising at least one opening, each opening being configured to slidably receive the connection interface;

a second busbar support positioned along a second side of the busbar, wherein the busbar is coupled to at least one of the busbar supports, and wherein the busbar provides primary support for a plurality of active modules electrically coupled to the busbar; and a plurality of switchgear components electrically and mechanically coupled to the connection interface, the switchgear components being suspended from the connection interface and supported by the connection interface and the first busbar support without additional support for the switchgear components.

19. The busbar support system of claim 18, further comprising:

a support frame coupled to the first busbar support and the second busbar support, the support frame comprising:

a first frame support positioned along a first edge of the first and second busbar supports and substantially perpendicular to the first and second busbar supports, wherein the first frame support is coupled to the first edge of the first and second busbar supports;

a second frame support positioned along a second edge of the first and second busbar supports and substantially perpendicular to the first and second busbar supports, wherein the second frame support is coupled to the second edge of the first and second busbar supports; and at least one frame support member, each frame support member having a first end and a second end, the first end coupled to the first frame support and the second end coupled to the second frame support.

20. The busbar support system of claim 18, wherein each of the first and second busbar supports comprises a metallic plate.

21. The busbar support system of claim 18, further comprising:

a first support bar positioned along a top edge of the first busbar support; and a second support bar positioned along a top edge of the second busbar support, wherein a first connection interface for a buswork component is positioned above and lies upon the first support bar, and a second connection interface for a another buswork component is positioned above and lies upon the second support bar.

22. The busbar support system of claim 18, wherein the busbar is encapsulated within a solid dielectric medium.

23. The busbar support system of claim 22, further comprising a ground plane positioned along the exterior of the solid dielectric medium.

24. The busbar support system of claim 18, wherein each of the first busbar support and the second busbar support comprises:

a first support panel positioned along the first side of the busbar, the first support panel comprising a first edge and a second edge, the second edge being below the first edge;

a first support channel positioned below and parallel to the first support panel, the first support channel comprising a top edge and a bottom edge, the top edge of the first support channel coupled to the second edge of the first support panel;

a second support panel positioned below and parallel to the first support channel, the second support panel comprising a top edge and a bottom edge, the top edge of the second support panel coupled to the bottom edge of the first support channel;

a second support channel positioned below and parallel to the second support panel, the second support channel comprising a top edge and a bottom edge, the top edge of the second support channel coupled to the bottom edge of the second support panel; and a third support panel positioned below and parallel to the second support channel, the third support panel comprising a top edge and a bottom edge, the top edge of the third support panel coupled to the bottom edge of the second support channel;

wherein at least one of the support panels further comprises at least one opening, each opening configured to slidably receive a connection interface for the busbar.

25. The busbar support system of claim 18, wherein the busbar is configured to be rated to be energized to at least 5000 volts and carry at least 200 Amps of current.

26. A busbar support system for a switchgear, comprising:
at least one busbar, each busbar being encapsulated within a solid dielectric medium;
a first busbar support positioned along a first side of the busbar;
a second busbar support positioned along a second side of the busbar, wherein the busbar is coupled to at least one of the busbar supports, and wherein the busbar provides support for a plurality of active modules electrically coupled to the busbar;
a first support bar positioned along a top edge of the first busbar support; and
a second support bar positioned along a top edge of the second busbar support,
wherein a first connection interface for a buswork component is positioned above and lies upon the first support bar, and a second connection interface for another buswork component is positioned above and lies upon the second support bar.

27. A busbar support system for a switchgear, comprising:
at least one busbar, each busbar being encapsulated within a solid dielectric medium;
a first busbar support positioned along a first side of the busbar;
a second busbar support positioned along a second side of the busbar, wherein the busbar is coupled to at least one of the busbar supports, and wherein the busbar provides support for a plurality of active modules electrically coupled to the busbar,
wherein each of the first and second busbar support comprises
a first support panel positioned along the first side of the busbar, the first support panel comprising a first edge and a second edge, the second edge being below the first edge,
a first support channel positioned below and parallel to the first support panel, the first support channel comprising a top edge and a bottom edge, the top edge of the first support channel coupled to the second edge of the first support panel,
a second support panel positioned below and parallel to the first support channel, the second support panel comprising a top edge and a bottom edge, the top edge of the second support panel coupled to the bottom edge of the first support channel,
a second support channel positioned below and parallel to the second support panel, the second support channel comprising a top edge and a bottom edge, the top edge of the second support channel coupled to the bottom edge of the second support panel, and
a third support panel positioned below and parallel to the second support channel, the third support panel comprising a top edge and a bottom edge, the top edge of the third support panel coupled to the bottom edge of the second support channel,
wherein at least one of the support panels further comprises at least one opening, each opening configured to slidably receive a connection interface for the busbar.

28. A busbar support system for a switchgear, comprising:
at least one busbar, each busbar comprising a connection interface;
a first busbar support positioned along a first side of the busbar and comprising at least one opening, each opening being configured to slidably receive the connection interface;
a second busbar support positioned along a second side of the busbar, wherein the busbar is coupled to at least one of the busbar supports, and wherein the busbar provides primary support for a plurality of active modules electrically coupled to the busbar; and
a support frame coupled to the first busbar support and the second busbar support, the support frame comprising:
a first frame support positioned along a first edge of the first and second busbar supports and substantially perpendicular to the first and second busbar supports, wherein the first frame support is coupled to the first edge of the first and second busbar supports,
a second frame support positioned along a second edge of the first and second busbar supports and substantially perpendicular to the first and second busbar supports, wherein the second frame support is coupled to the second edge of the first and second busbar supports, and
at least one frame support member, each frame support member having a first end and a second end, the first end coupled to the first frame support and the second end coupled to the second frame support.

29. A busbar support system for a switchgear, comprising:
at least one busbar, each busbar comprising a connection interface and providing primary support for a plurality of active modules electrically coupled to the busbar;
a first busbar support positioned along a first side of the busbar and comprising at least one opening, each opening being configured to slidably receive the connection interface;
a second busbar support positioned along a second side of the busbar, wherein the busbar is coupled to at least one of the busbar supports, and wherein the busbar provides primary support for a plurality of active modules electrically coupled to the busbar;
a first support bar positioned along a top edge of the first busbar support; and
a second support bar positioned along a top edge of the second busbar support,
wherein a first connection interface for a buswork component is positioned above and lies upon the first support bar, and a second connection interface for another buswork component is positioned above and lies upon the second support bar.

30. A busbar support system for a switchgear, comprising:
at least one busbar, each busbar comprising a connection interface;
a first busbar support positioned along a first side of the busbar and comprising at least one opening, each opening being configured to slidably receive the connection interface; and
a second busbar support positioned along a second side of the busbar, wherein the busbar is coupled to at least one of the busbar supports, and wherein the busbar provides primary support for a plurality of active modules electrically coupled to the busbar, wherein each of the first busbar support and the second busbar support comprises a first support panel positioned along the first side of the busbar, the first support panel comprising a first edge and a second edge, the second edge being below the first edge, a first support channel positioned below and parallel to the first support panel, the first support channel comprising a top edge and a bottom edge, the top edge of the first support channel coupled to the second edge of the first support panel, a second support panel positioned below and parallel to the first support channel, the second support panel comprising a top edge and a bottom edge, the top edge of the second support panel coupled to the bottom edge of the first support channel, a second support channel positioned below and parallel to the second support panel, the second support channel comprising a top edge and a bottom edge, the top edge of the second support channel coupled to the bottom edge of the second support panel, and a third support panel positioned below and parallel to the second support channel, the third support panel comprising a top edge and a bottom edge, the top edge of the third support panel coupled to the bottom edge of the second support channel, wherein at least one of the support panels further comprises at least one opening, each opening configured to slidably receive a connection interface for the busbar.

* * * * *